(12) United States Patent
Fahrbach

(10) Patent No.: US 11,428,916 B2
(45) Date of Patent: *Aug. 30, 2022

(54) LIGHT SHEET MICROSCOPE

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/325,733

(22) PCT Filed: Aug. 16, 2017

(86) PCT No.: PCT/EP2017/070789
§ 371 (c)(1),
(2) Date: Feb. 15, 2019

(87) PCT Pub. No.: WO2018/033582
PCT Pub. Date: Feb. 22, 2018

(65) Prior Publication Data
US 2019/0212536 A1  Jul. 11, 2019

(30) Foreign Application Priority Data

Aug. 15, 2016 (LU) .......................................... 93178

(51) Int. Cl.
*G01N 21/64* (2006.01)
*G02B 21/00* (2006.01)
*G02B 21/36* (2006.01)

(52) U.S. Cl.
CPC ..... *G02B 21/0032* (2013.01); *G01N 21/6458* (2013.01); *G02B 21/0076* (2013.01);
(Continued)

(58) Field of Classification Search
CPC ....... G01N 21/6458; G01N 2021/6463; G01N 2201/063; G02B 21/0032; G02B 21/0076; G02B 21/367
(Continued)

(56) References Cited

U.S. PATENT DOCUMENTS 8,570,649 B2 * 10/2013 Truong ................ G02B 21/367
359/385
10,018,819 B2 * 7/2018 Iguchi ................ G02B 21/0032
(Continued)

FOREIGN PATENT DOCUMENTS

DE 102008009216 A1  8/2009
DE 102009044984 A1  3/2011
(Continued)

OTHER PUBLICATIONS

Gutierrez-Vega et al., "New class of non-diffracting beams: Mathieu beams", Proceedings of SPIE, vol. 4271, pp. 73-80. (Year: 2001).*
(Continued)

*Primary Examiner* — Kiho Kim
(74) *Attorney, Agent, or Firm* — Leydig, Voit & Mayer, Ltd.

(57) ABSTRACT

A light sheet microscope includes an illuminator having a beam source which is designed to direct an illumination beam propagating along an illumination axis onto a sample. A light-sheet generator is designed to generate a light-sheet-like illumination light distribution illuminating the sample in a partial area from the illumination beam. A detection unit has a detector which is designed to capture detection light originating from the partial area of the sample illuminated with the illumination light distribution. The illuminator comprises a beam modulator adapted to modulate the illumination beam along the illumination axis in such a way that light exposure of the partial area of the sample illuminated
(Continued)

by the illumination light distribution varies along the illumination axis.

21 Claims, 17 Drawing Sheets

(52) U.S. Cl.
CPC ... *G02B 21/367* (2013.01); *G01N 2021/6463* (2013.01); *G01N 2201/063* (2013.01)

(58) Field of Classification Search
USPC .................................................. 250/459.1
See application file for complete search history.

(56) References Cited

U.S. PATENT DOCUMENTS

| | | | |
|---|---|---|---|
| 10,024,793 B2* | 7/2018 | Ritter | G02B 27/58 |
| 2011/0036996 A1* | 2/2011 | Wolleschensky | G02B 21/002 |
| | | | 250/459.1 |
| 2011/0122488 A1* | 5/2011 | Truong | G01N 21/6408 |
| | | | 359/385 |
| 2011/0134521 A1* | 6/2011 | Truong | G02B 21/16 |
| | | | 359/388 |
| 2012/0049087 A1* | 3/2012 | Choi | G02B 21/367 |
| | | | 250/459.1 |
| 2012/0098949 A1* | 4/2012 | Knebel | G02B 21/10 |
| | | | 348/79 |
| 2012/0200693 A1* | 8/2012 | Lippert | G02B 21/002 |
| | | | 348/79 |
| 2012/0281264 A1* | 11/2012 | Lippert | G02B 21/16 |
| | | | 359/199.3 |
| 2013/0335818 A1* | 12/2013 | Knebel | G02B 21/06 |
| | | | 359/385 |
| 2014/0092463 A1 | 4/2014 | Nomura et al. | |
| 2014/0139840 A1* | 5/2014 | Judkewitz | G02B 21/367 |
| | | | 356/456 |
| 2014/0340483 A1* | 11/2014 | Ritter | G02B 21/361 |
| | | | 348/46 |
| 2015/0022881 A1* | 1/2015 | Loza Alvarez | G02B 21/0076 |
| | | | 359/385 |
| 2015/0029325 A1* | 1/2015 | Dholakia | G02B 27/0927 |
| | | | 348/79 |
| 2015/0098126 A1* | 4/2015 | Keller | G02B 21/0076 |
| | | | 359/385 |
| 2015/0168732 A1 | 6/2015 | Singer et al. | |
| 2015/0177506 A1* | 6/2015 | Nishiwaki | H04N 13/239 |
| | | | 348/46 |
| 2015/0226670 A1* | 8/2015 | Kleppe | G02B 21/26 |
| | | | 359/385 |
| 2015/0286042 A1 | 10/2015 | Hilbert et al. | |
| 2015/0323774 A1* | 11/2015 | Lippert | G02B 21/002 |
| | | | 359/388 |
| 2016/0305883 A1* | 10/2016 | Betzig | G02B 21/06 |
| 2016/0327779 A1* | 11/2016 | Hillman | G02B 23/04 |
| 2017/0199363 A1* | 7/2017 | Mazilu | G02B 21/0032 |
| 2018/0203217 A1* | 7/2018 | Knebel | G02B 21/006 |
| 2018/0267289 A1* | 9/2018 | Kalkbrenner | G02B 21/367 |
| 2018/0275389 A1* | 9/2018 | Shepherd | G02B 21/025 |
| 2018/0292321 A1* | 10/2018 | Fiolka | G02B 21/16 |
| 2019/0086656 A1 | 3/2019 | Fahrbach et al. | |
| 2019/0265454 A1* | 8/2019 | Kalkbrenner | G02B 21/32 |

FOREIGN PATENT DOCUMENTS

| | | |
|---|---|---|
| DE | 102011000835 B4 | 8/2012 |
| JP | 2007-079278 A | 3/2007 |
| JP | 2015-527604 A | 9/2015 |
| WO | WO 2011059826 A2 | 5/2011 |
| WO | WO 2013011680 A1 | 1/2013 |
| WO | WO 2014056992 A1 | 4/2014 |
| WO | WO 2015109323 A2 | 7/2015 |
| WO | WO 2017109156 A1 | 6/2017 |

OTHER PUBLICATIONS

Weijian Zong, et al., "Large-field high.resolution two.photon digital scanned light-sheet microscopy", Open Letter to the Editor, Cell Research, Sep. 26, 2014, pp. 1-4.

Sunil Kumar, et al., "High-speed 2D and 3D fluorescence microscopy of cardiac myocytes", Optics Express, vol. 19, No. 15, Jul. 18, 2011, pp. 1-9.

C. Dunsby, "Optically sectioned imaging by oblique plane microscopy", Optics Express, vol. 16, No. 25, Dec. 8, 2008, pp. 20306-20316.

Kevin M. Dean, et al., "Uniform and scalable light-sheets generated by extended focusing", Optics Express, vol. 22, No. 21, Oct. 20, 2014, pp. 26141-26152.

Aleksander K. Chmielewski, et al., „Fast imaging of live organisms with sculpted light sheets, Scientific Reports, vol. 5, Apr. 20, 2015, pp. 1-9.

Matthew B. Bouchard, et al., "Swept confocally-aligned planar excitation (SCAPE) microscopy for high-speed volumetric imaging of behaving organisms", Nature Photonics, No. 9, Jan. 19, 2015, pp. 1-22, XP055427410A.

Makio Tokunaga, et al., "Highly inclined thin illumination enables clear single-molecule imaging in cells", Nature Methods, vol. 5, No. 2, Feb., 2008, pp. 159-161.

R. A. Hoebe, et al., „Controlled light-exposure microscopy reduces photobleaching and phototoxicity in fluorescence live-cell imaging, Nature Biotechnology, vol. 25, No. 2, Feb., 2007, pp. 249-253.

Fahrbach, Florian O. and Alexander Rohrbach, "Propagation stability of self-reconstructing Bessel beams enables contrast-enhanced imaging in thick media," Nature Communications, 3:632, Jan. 17, 2012.

Fahrbach, Florian O. et al. "Microscopy with self-reconstructing beams," Nature Photonics, Sep. 12, 2010.

\* cited by examiner

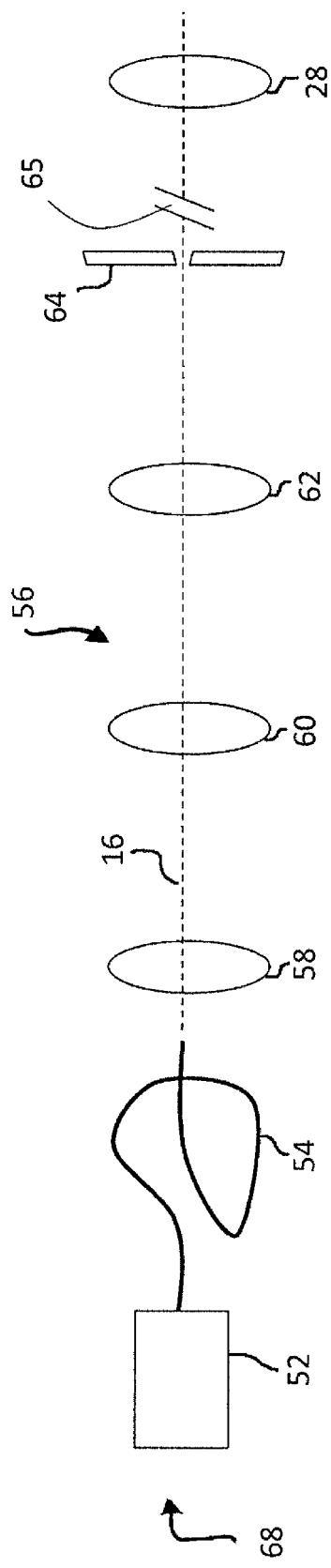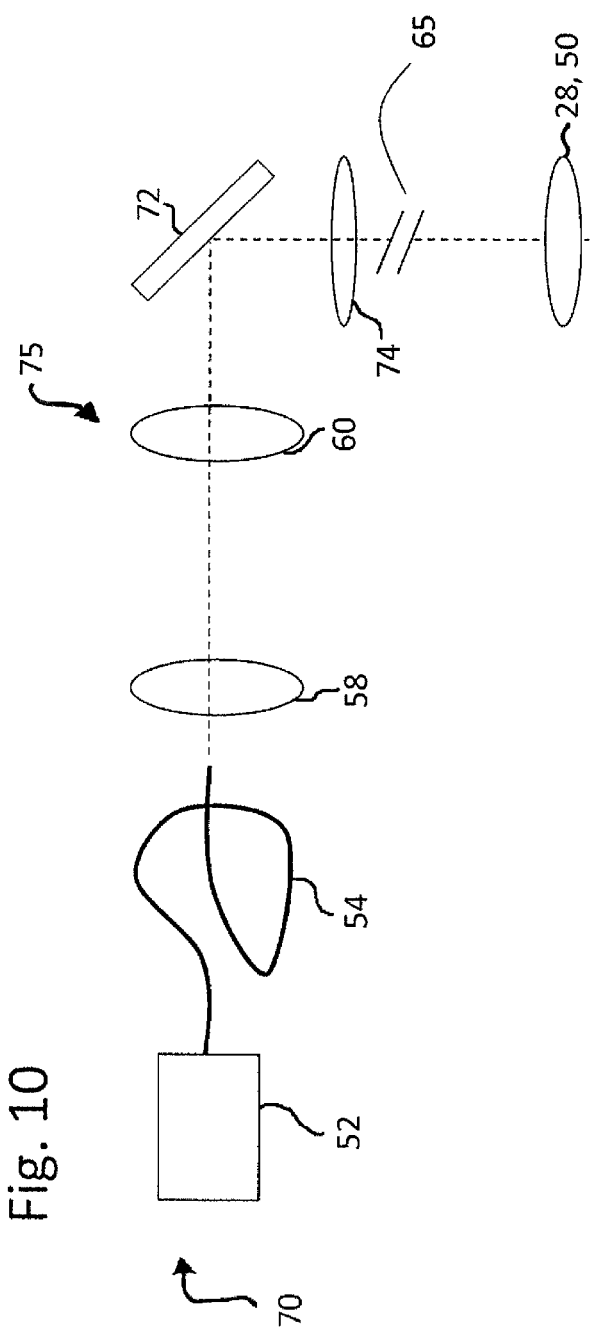

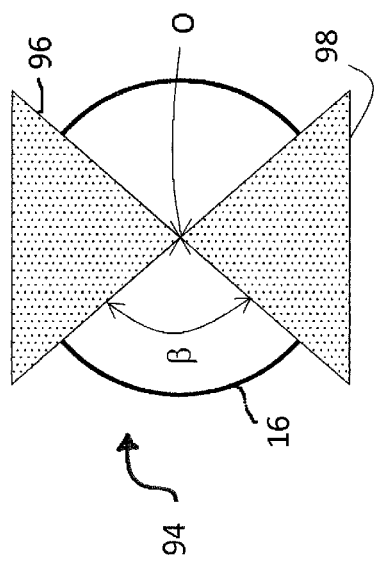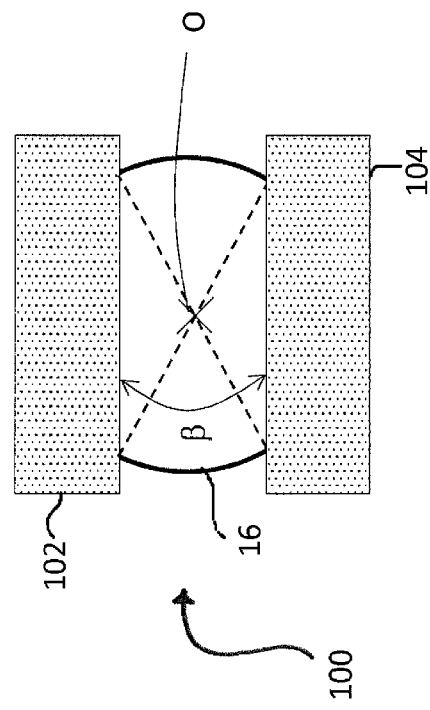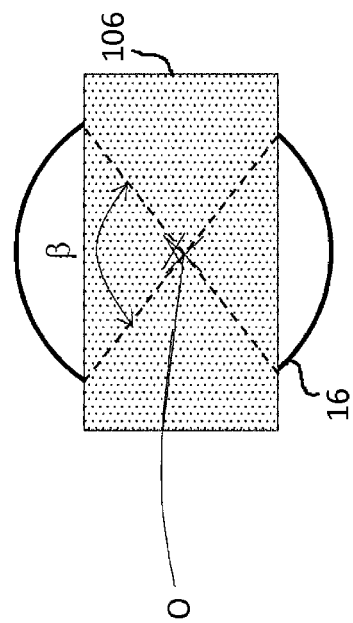

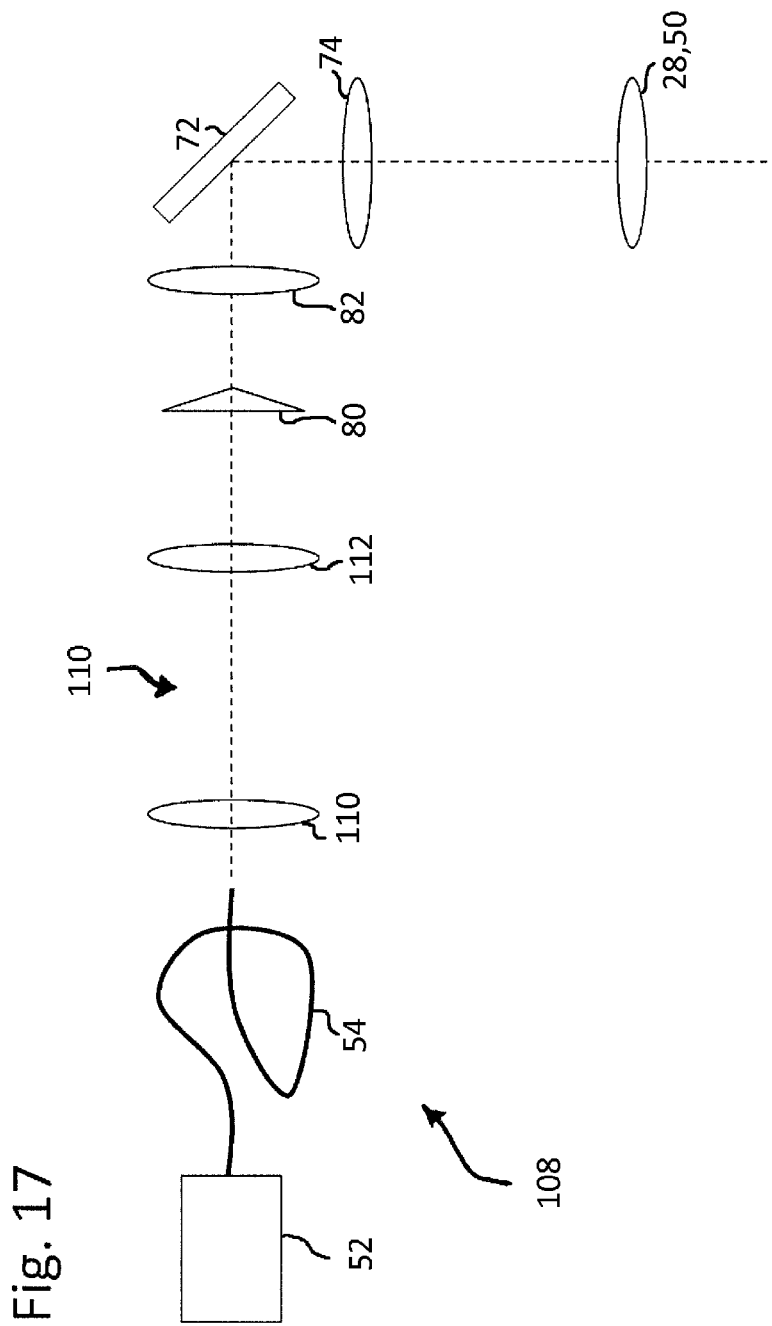

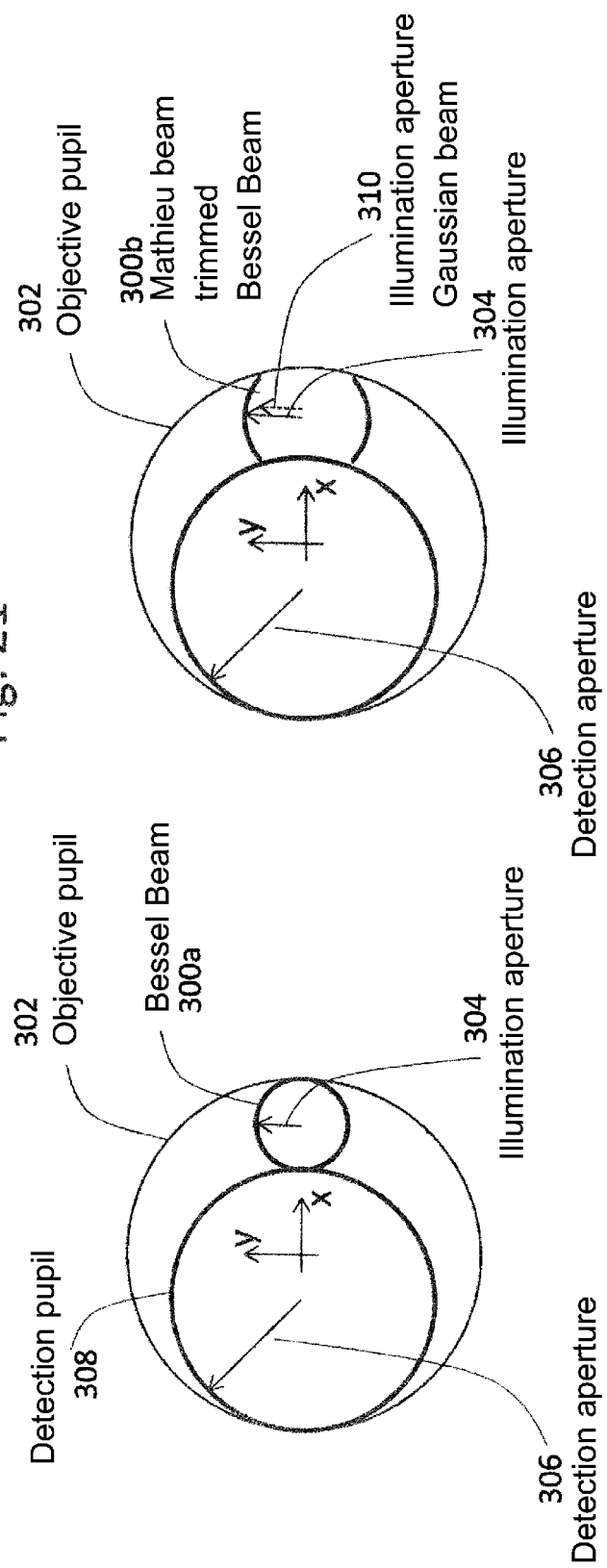

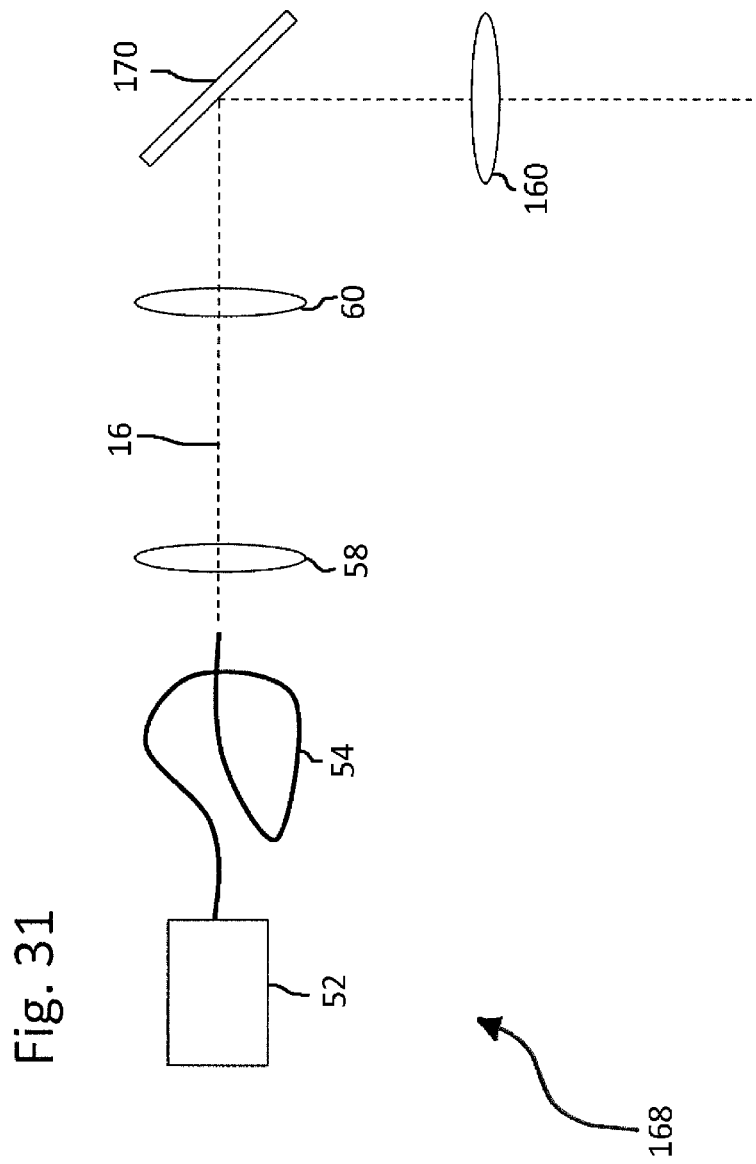

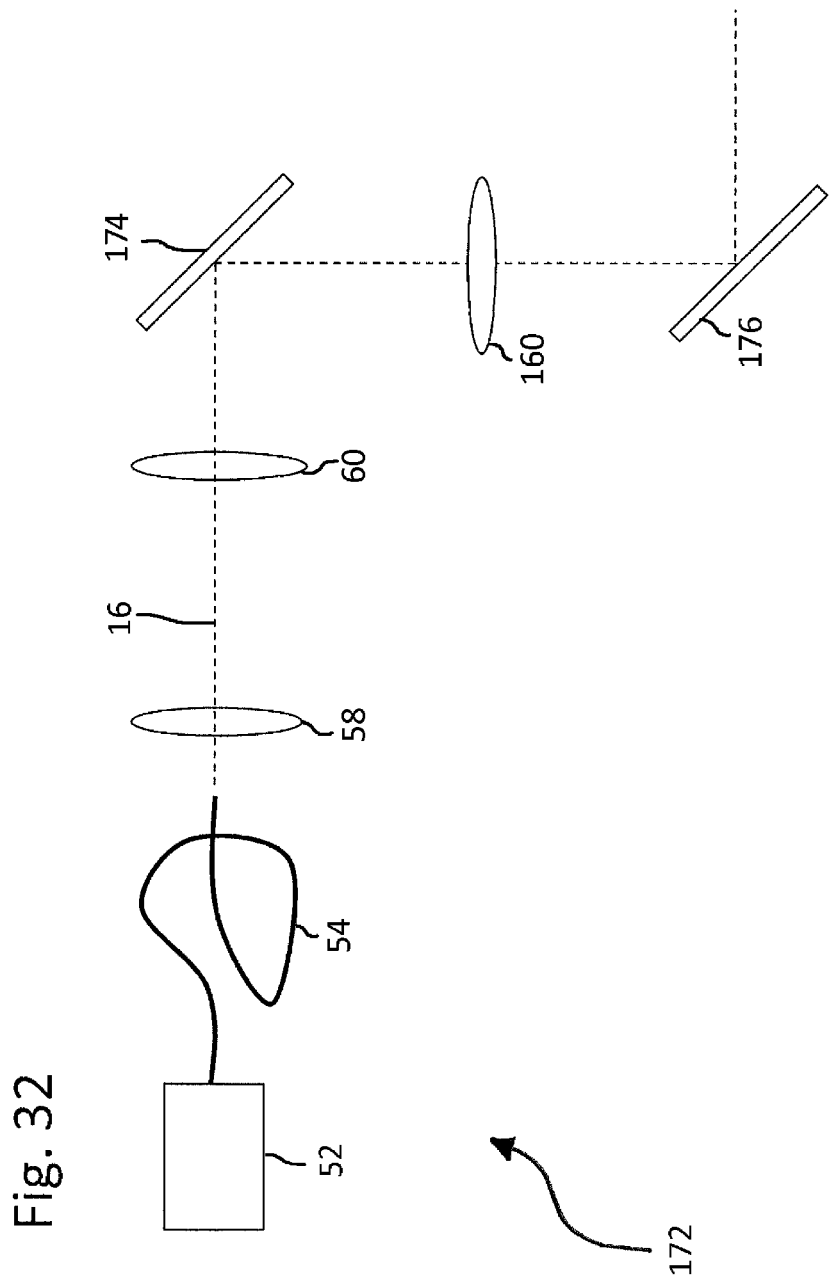

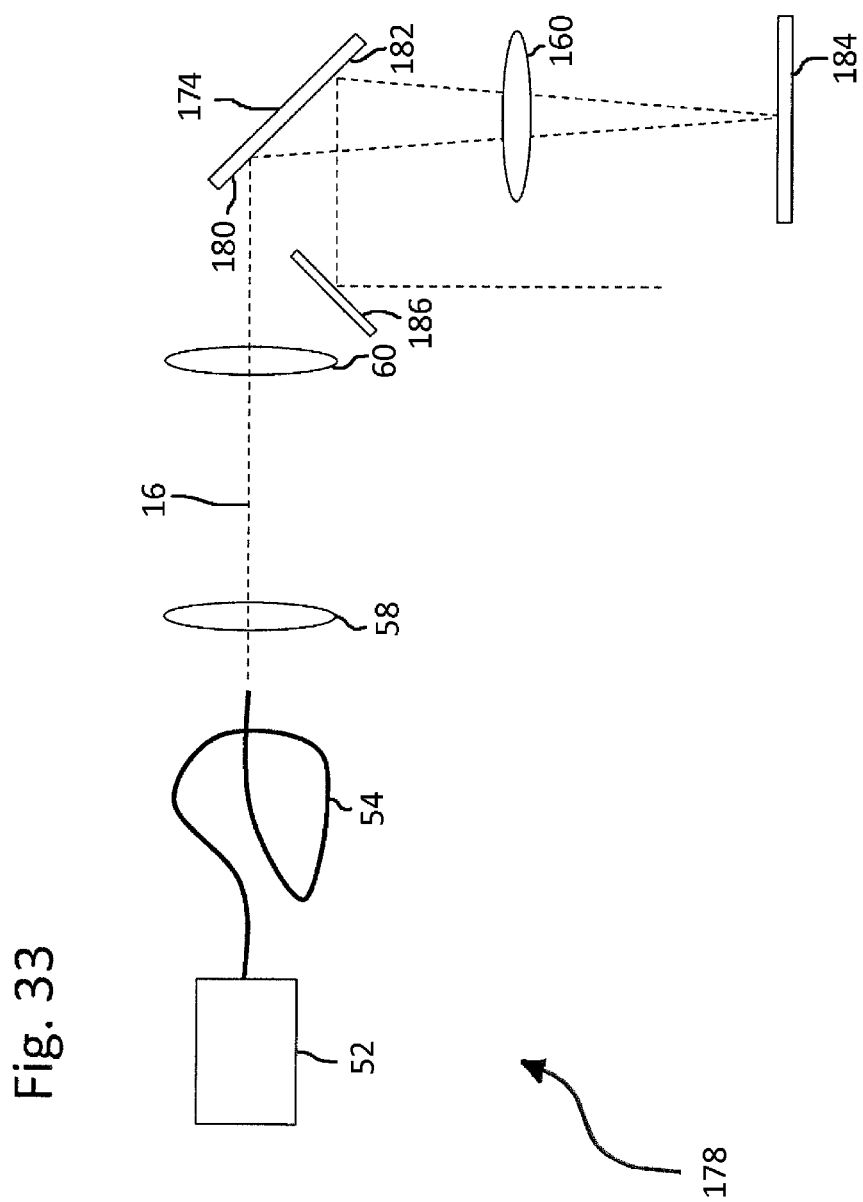

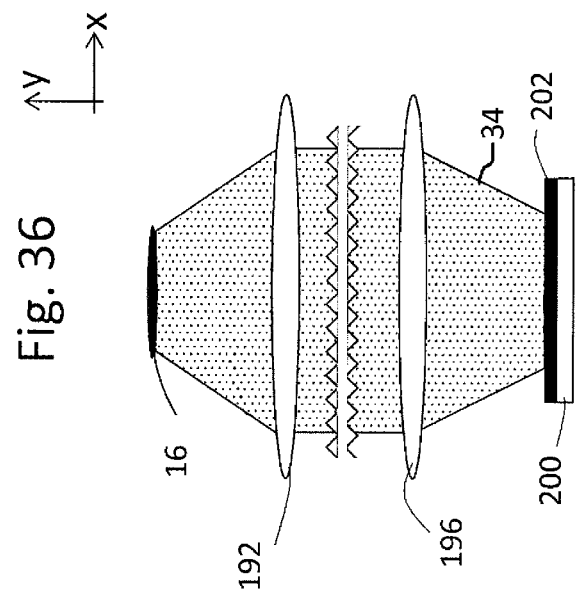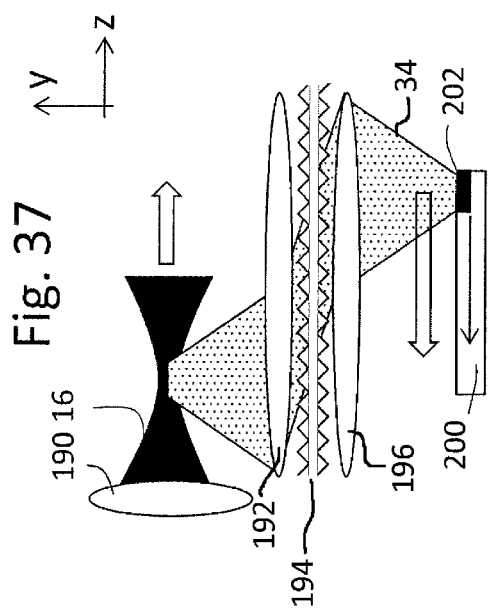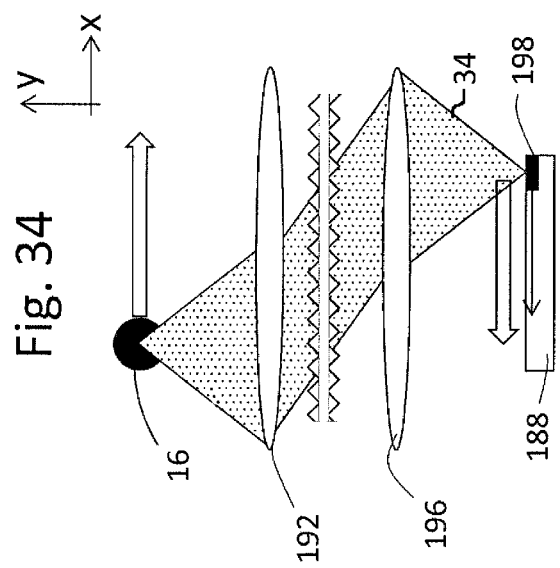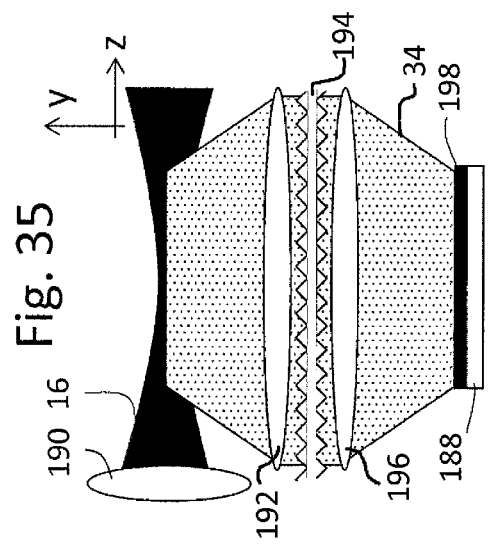

LIGHT SHEET MICROSCOPE

CROSS-REFERENCE TO PRIOR APPLICATIONS

This application is a U.S. National Stage Application under 35 U.S.C. § 371 of International Application No. PCT/EP2017/070789 filed on Aug. 16, 2017, and claims benefit to Luxembourgian Patent Application No. LU 93178 filed on Aug. 15, 2016. The International Application was published in German on Feb. 22, 2018, as WO 2018/033582 A1 under PCT Article 21(2).

FIELD

The invention relates to a light sheet microscope, comprising an illuminating unit having a beam source, which is designed to direct an illuminating beam propagating along an illumination axis toward a sample, a light-sheet producing means, which is designed to produce a light-sheet-type illuminating light distribution that illuminates the sample in a partial region from the illuminating beam, and a detection unit, which has a detector, which is designed to sense detection light, which originates from the partial region of the sample illuminated with the illuminating light distribution.

BACKGROUND

In particular in fluorescence microscopy, microscopy methods in which the sample is illuminated with a flat or linearly extended light distribution have been used recently. Examples of these are microscopy methods known under the designations SPIM (Single Plane Illumination Microscopy), OPM (Oblique Plane Microscopy) and SCAPE (Swept Confocally Aligned Planar Excitation). For example, in a SPIM microscope, an illumination light beam is focused and thus expanded only in one direction by means of a cylindrical lens, whereby the sample is illuminated with a light sheet or a light disk that illuminates only one sample plane within the sample. For illumination and detection, a SPIM microscope has two separate objectives on the sample side, whose optical axes are perpendicular to each other. The sample plane to be imaged is perpendicular to the optical axis of the detection objective. This sample plane is illuminated by the light sheet which irradiates the illumination objective into the sample perpendicular to the optical axis of the detection objective.

In contrast, in the SCAPE method, a single sample-side objective is used for both illumination and detection. The illumination is performed with a light sheet lying obliquely to the optical axis of the objective. As a result of this inclination of the light sheet, a SCAPE microscope conventionally has device optics interacting with the lens with partial optics which are obliquely positioned relative to one another and which, via an intermediate image, ensure that the sample region illuminated with the oblique light sheet is displayed on the detector in the correct position and largely optically corrected.

For a more detailed explanation of the aforementioned SPIM, OPM and SCAPE method, exemplary reference is made to the publications by Kumar, S. et al, High-speed 2D and 3D fluorescence microscopy of cardiac myocytes. Opt. Express 19, 13839 (2011); Dunsby, C., Optically sectioned imaging by oblique plane microscopy, Opt. Express 16, 20306-20316 (2008) and Bouchard, M. B. et al., Swept confocally-aligned planar excitation (SCAPE) microscopy for high speed volumetric imaging of behaving organisms, Nat. Photonics 9, 113-119 (2015) as well as patent documents U.S. Pat. No. 8,582,203 B2 and U.S. Pat. No. 8,619,237 B2.

A related microscopy method which, however, does not require any device optics, is the so-called HILO method (Highly Inclined And Laminated Optical Sheet). Reference is made to Tokunaga, M., Imamoto, N. & Sakata-Sogawa, K., Highly inclined thin illumination enables clear single molecule imaging in cells., Nat. Methods 5, 159-161 (2008).

In DE 10 2011 000 835 B4, the light sheet provided for oblique illumination of the sample is produced by means of a scanning unit which is located in a plane conjugate to the rear focal plane of the illumination objective. The fluorescent light to be detected is coupled out between the objective and the scanning unit.

The prior art is further referred to WO 2015/109323 A2, which inter alia shows a microscope assembly in which a dichroic mirror for separating the fluorescence light to be detected is arranged downstream of a scanning mirror in the light direction, so that the fluorescent light is directly scanned by the scanning mirror. This structure corresponds largely to the structure of a point-scanning confocal microscope. However, it differs therefrom in that the illumination beam is weakly focused and directed obliquely into the sample. On the other hand, the fluorescent light collected from the oblique line focus running against the focal plane of the objective lens is erected with an upright optical system. As a result, image information along the illuminated line can be obtained by means of a line sensor. Since the scanning mirror is used both for scanning the sample with the illumination beam and for descanning the detected fluorescent light, a stationary detector can be used.

In the light sheet microscopy methods known from the prior art, strong differences in brightness can occur within the recorded image, in particular when the focal optics of the detection unit do not coincide with the illuminated sample plane. For example, in OPM and SCAPE methods, the illuminated sample plane is arranged obliquely to the focal plane of the objective intended jointly for illumination and detection. Thus, both near-surface sample areas and low-lying sample areas are imaged during image acquisition. The deeper the illumination beam penetrates the sample, the more it is weakened by scattering and/or absorption. Those areas of the resulting image that are associated with the lower-lying and thus less illuminated sample areas therefore are less bright than the image areas in which near-surface layers of the sample are imaged.

The publication by Bouchard et al. indicated above, as a solution to the problem proposes introducing a filter in the detection beam path which attenuates particularly bright regions to such an extent that a substantially homogeneous brightness distribution is produced. A relatively comparatively rough attenuation compensation is thus possible.

From the prior art, a number of other methods are known which aim to avoid in the recorded image brightness differences due to scattering and/or absorption of the illumination light. For example, reference is made to Dean, K. & Fiolka, R.: Uniform and scalable light-sheets generated by extended focusing, Opt. Express 22, 26141-26152 (2014); Chmielewski, A. K. et al.: Fast imaging of live organisms with sculpted light sheets, Sci. Rep. 5, (2015); Zong, W. et al.: Large-field high-resolution two-photon digital scanned light-sheet microscopy, Cell Res. 25, 254-257 (2015); Hoebe, R. A. et al.: Controlled light-exposure microscopy reduces photobleaching and phototoxicity in fluorescence live-cell imaging. Nat. Biotechnol. 25, 249-253 (2007).

However, the technical implementation of these methods is often expensive. In addition, they are not always applicable in light-sheet microscopy.

SUMMARY

In an embodiment, the present invention provides a light sheet microscope including an illuminator having a beam source which is configured to direct an illumination beam propagating along an illumination axis onto a sample. A light-sheet generator is configured to generate a light-sheet-like illumination light distribution illuminating the sample in a partial area from the illumination beam. A detection unit has a detector which is configured to capture detection light originating from the partial area of the sample illuminated with the illumination light distribution. The illuminator comprises a beam modulator adapted to modulate the illumination beam along the illumination axis in such a way that light exposure of the partial area of the sample illuminated by the illumination light distribution varies along the illumination axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 9 a beam source according to the invention for generating a light sheet;

FIG. 10 an alternative embodiment of a beam source for generating a light sheet;

FIG. 14 a schematic representation of a aperture arrangement, which is usable in the beam source for the production of trimmed Bessel beams;

FIG. 15 a schematic representation showing an alternative aperture arrangement for the production of trimmed Bessel beams;

FIG. 16 a schematic representation showing a further alternative aperture arrangement for the production of trimmed Bessel beams;

FIG. 17 a beam source according to the invention for generating Mathieu beams;

FIG. 20 a pupil view showing the objective pupil and the detection pupil when using a Bessel beam;

FIG. 21 a pupil view showing the objective pupil and the detection pupil when using a Mathieu beam or a trimmed Bessel beam;

FIG. 31 a beam source according to the invention for generating an illumination beam with absorption-compensating beam profile;

FIG. 32 a further beam source according to the invention for generating an illumination beam with absorption-compensating beam profile;

FIG. 33 a further beam source according to the invention for generating an illumination beam with absorption-compensating beam profile;

FIG. 34 an embodiment of the invention, which has a surface detector with rolling shutter function, in an xy sectional view;

FIG. 35 the embodiment of FIG. 34 in a yz-sectional view;

FIG. 36 another embodiment, which has an surface detector with rolling shutter function, in an xy sectional view; and FIG. 37 the embodiment of FIG. 36 in a yz sectional view.

DETAILED DESCRIPTION

Figure 2:
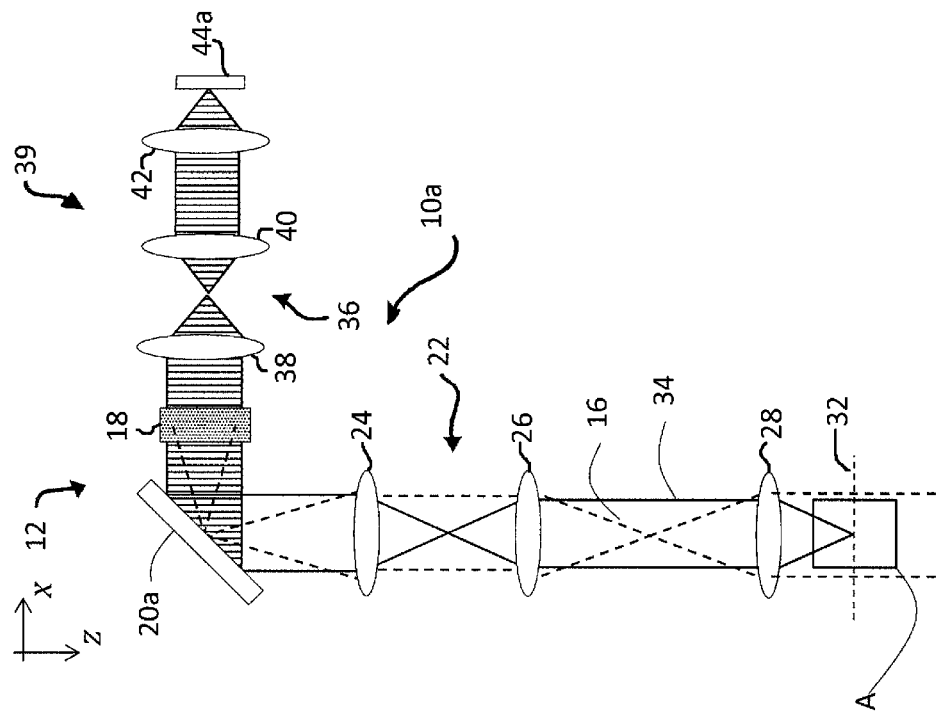
FIG. 2 the microscope according to the first embodiment in an x-z-sectional view.

Embodiments of the invention provide a light-sheet microscope and a method for microscopic imaging of a sample, which make it possible to avoid differences in brightness caused by attenuation of the illumination beam within an image.

The illumination unit of the light-sheet microscope according to an embodiment of the invention comprises a beam modulating means which is designed to modulate the illumination beam along the illumination axis, i.e. along an axis defining the beam propagation direction, such that the exposure of the portion of the sample illuminated by the illumination light distribution varies along the illumination axis. The exposure of the respective portion of the sample can be varied by changing the illumination intensity and thus the intensity of the illumination beam and/or by changing the exposure time during which the portion of the sample is exposed to the illumination beam. This exposure variation along the illumination axis can be selected systematically so that the brightness of the detected image field is as constant as possible.

Preferably, the illumination beam along the illumination axis is modulated in such a way that the exposure of the portion of the sample illuminated with the illumination light distribution increases along the illumination axis.

Preferably, the beam modulation means is designed to shift a depth of focus area or focus of the illumination beam along the illumination axis. Since the depth of focus area of the illumination beam is displaceable along the illumination axis, the intensity and/or the exposure duration for each position on the illumination axis can be adjusted such that the sample is illuminated with the desired amount of light in this position.

Preferably, the beam modulating means has an illumination objective that is displaceable along the illumination axis. In this embodiment, therefore, the displacement of the depth of focus area of the illumination beam is realized via an optical component arranged outside the beam source.

In an alternative embodiment, the beam modulating means includes a tunable lens included in the beam source for shifting the depth of focus area of the illumination beam. By means of such a tunable lens whose optical effect is variably adjustable, the illumination beam can be influenced in a particularly simple manner so that its depth of focus area is moved along the illumination axis.

In a further alternative embodiment, the beam modulating means has an optical element contained in the beam source for influencing the optical path length of the illumination beam. This optical element comprises, for example, a plurality of transparent blocks which can optionally be introduced into a beam path of the illumination beam and which have different thicknesses along the illumination axis. The optical element is e.g. designed as a displaceable disc, by means of a corresponding drive perpendicular to the illumination axis, on which the transparent blocks are arranged in such a way, that either one of these blocks is introduced into the beam path of the illumination beam, when the disc is displaced perpendicular to the illumination axis. In another embodiment, the transparent blocks changing the path length of the illumination beam can also be arranged on a disk which can be rotated about a rotation axis parallel to the illumination axis.

In a particularly preferred embodiment, the beam modulation means is designed to modulate the intensity of the illumination beam as a function of the position of the depth of focus area along the illumination axis. In this case, in particular the near-axis intensity of the illumination beam is meant, which corresponds to the power which results when the beam intensity is integrated over a spatially limited radial area around the illumination axis or the light propagation axis. In this case, for example, the laser light source generating the illumination beam is controlled correspondingly in synchronism with the shift of the depth of focus area.

In an embodiment in which the shift of the depth of focus area is accompanied by the illumination beam penetrating progressively deeper into the sample, the beam modulating means is designed such that it increases the intensity of the illumination beam as the penetration depth of the depth of focus area increases in the sample.

In particular, the beam modulating means may be configured to increase the intensity of the illumination beam as the penetration depth of the depth of focus area into the sample increases. In this way, attenuation of the illumination beam as a result of scattering and/or absorption can be compensated in a particularly simple manner.

Additionally or alternatively, the beam modulating means can also be designed such that it varies the displacement speed of the depth of focus area of the illumination beam as a function of its position along the illumination axis. This variation in the displacement speed corresponds to a variation in the exposure time at the location of the sample area to be imaged.

In particular, the beam modulating means is preferably designed to reduce the shifting speed of the depth of focus area of the illumination beam with increasing penetration depth into the sample in order to correspondingly increase the exposure time.

The beam modulating means can also be designed as a beam-shaping optical system that, in order to modulate the illumination beam along the illumination axis, influences its radial intensity profile in at least one direction perpendicular to the illumination axis.

The beam-shaping optics are designed, for example, to adjust the transmission of the illumination beam as a function of the radial distance from the illumination axis such that the intensity of the illumination beam increases along the illumination axis.

The beam-shaping optics comprise, for example, two phase-modulating elements of which a first element adjusts the phase of the illumination beam such that the illumination beam on the second element has an amplitude with a predetermined, preferably radially rising profile. In this embodiment, any light losses associated with the generation of the desired intensity profile can be minimized.

The phase-modulating elements can also be formed on a one-piece component, wherein the illumination beam reflected on the first phase-modulating element is returned via a mirror to the second phase-modulating element. This design enables a particularly compact construction.

In one embodiment, the beam-shaping optics are designed to impose a phase on the illumination beam which increases or decreases linearly proportional to the radial distance from the illumination axis. In particular, the beam-shaping optics are preferably designed to form at least one Bessel beam or at least one Mathieu beam from the illumination beam.

A Bessel beam, which can be generated, for example, by means of an axicon, has the property of being non-bending and self-reconstructing. The latter means that a Bessel beam, if it is partially disturbed or blocked at a point along the illumination axis, for example by a scattering center, regains its shape in its further course. Thus, the illumination with a Bessel beam, especially in scattering and/or absorbing samples is of great advantage. This applies in particular to OPM and SCAPE applications in which the illuminated sample plane is tilted relative to the detected focal plane, whereby the detection light which contributes to the resulting image originates both from near-surface regions and from deeper regions of the sample.

The use of a Bessel beam has further advantages in addition to the achievable higher resolution and better penetration depth. Such an advantage can be seen, for example, in that a Bessel beam is not subject to any spherical aberration due to its narrow angular spectrum.

The use of a Mathieu beam is also advantageous. Like Bessel beams, such beams are non-bending and have similar properties and thus similar advantages. As is known, however, a Mathieu beam has a cross-sectional profile that is different from the profile of a Bessel beam. For example, a Mathieu beam may be generated by illuminating an axicon with a cross-sectionally elliptical Gaussian beam.

The Bessel and Mathieu beams can be modulated in their axial profile in a simple manner, i.e. the intensity in a narrow strip along the optical axis, by supplying light to this beam section from the radial direction, i.e. from outside this strip. This is possible since these beams have a wide angular spectrum measured at their depth of focus, i.e. they have contributions with comparatively large radial components.

Of course, a linear and non-linear excitation of fluorescence is always possible with the beams mentioned here.

In a further preferred embodiment, the beam-shaping optical system includes an aperture arrangement which is designed to trim the beam cross section of the illumination beam. In this way, in particular a Bessel beam can be brought into a beam shape which is particularly advantageous for light sheet microscopy. Thus, especially in an OPM application, such a beam, which is hereinafter referred to as a trimmed Bessel beam, as well as a Mathieu beam, can be used particularly advantageously. Thus, a trimmed Bessel beam or a Mathieu beam can be placed closer to the edge of the objective pupil, so that the overlap with the detection area is respectively smaller. As a result, a larger effective detection aperture or a larger effective illumination aperture can be used. A trimmed Bessel beam can be generated, for example, by using an axicon and a subordinate slit aperture.

The beam shaping optics preferably contain at least one spatial light modulator, short SLM, which is designed to generate the radial intensity profile of the illumination beam. This light modulator can be designed to modulate the intensity of the illumination beam in order to generate the desired beam profile. However, it is also possible for the light modulator to modulate the phase or simultaneously the phase and the intensity. The light modulator can be realized, for example, in the form of a convex or concave axicon, a grating, a hologram or a deformable mirror. It can be designed as a ferromagnetic SLM or as an LCoS SLM. Also a combination of several such elements can be used as a light modulator.

In a particular embodiment, the beam source has an anamorphic optics as a light-sheet generating means. Such an anamorphic optics, which may be embodied, for example, in the form of a cylindrical lens, expands the illumination beam only in one of the two directions perpendicular to the illumination axis. In this embodiment, the light sheet is thus generated statically.

In an alternative embodiment, the beam source has a first scanning element as a light sheet generating means, wherein this first scanning element is adapted to move the illumination beam along a first scanning axis. This movement of the illumination beam dynamically builds up the light sheet.

Another preferred embodiment comprises a second scanning element which is provided jointly for the illumination unit and the detection unit and which is designed to move the illumination beam along a second scanning axis which is perpendicular to the aforementioned first scanning axis. This second scanning element thus acts both on the illumination beam and on the detection light. The latter is thereby descanned along the second scanning axis. This means, that the return movement of the detection light to the second scanning element eliminates the scanning movement mediated by the scanning element with respect to the detection light in the sense of a counteracting effect, with the result that the detection light can be detected by means of a stationary detector.

In the embodiments explained above, in which the detection light is not scanned along the first scanning axis, the detector is preferably designed as a surface detector.

In a particularly preferred embodiment, the surface sensor has a plurality of sensor elements, which are controlled in such a way, that at a given time only a portion of the sensor elements in the manner of a movable, preferably strip-shaped shutter is activated. In this embodiment, the surface sensor is therefore provided with a rolling shutter function. It can accordingly be used like a line sensor moved along a scanning axis.

Another alternative embodiment has a scanning unit which is jointly provided for the illumination unit and the detection unit and is designed to move the illumination beam along a first scanning axis and along a second scanning axis which is perpendicular to the first scanning axis. This embodiment will scan the detection light along both scanning axes. In this case, the scanning unit can be formed from two separate scanning elements, of which the first provides for the scanning along the first scanning axis and a second for the scanning along the second scanning axis. However, it is also possible to provide only a single scanning element that performs both scanning movements.

The aforementioned scanning elements can each be embodied as galvanometer mirrors or as micro-electromechanical mirrors (MEMS). The use of an acousto-optical deflector (AOD) is also possible. Depending on the application, the scanning elements mentioned are then used as 1D scanners or 2D scanners.

The beam source preferably includes a light source which emits suitable laser light depending on the application, e.g. pulsed laser light, broadband laser light or light which is especially suitable for non-linear fluorescence excitation.

In the following, with reference to the FIGS. 1 to 8, various embodiments of a light-sheet microscope will first be explained, to which the beam modulation according to the invention can be applied. These various embodiments have in common that they each have a common objective for illumination and detection, i.e. an objective through which are conducted both the fluorescence-exciting illumination light and the detection light represented by the triggered fluorescence radiation. These embodiments accordingly operate in the manner of a SCAPE or an OPM microscope. However, it should be expressly pointed out at this point that the invention can also be applied to light sheet microscopes which provide separate objectives for illumination and detection, as is the case, for example, for a SPIM microscope.

Figure 1:
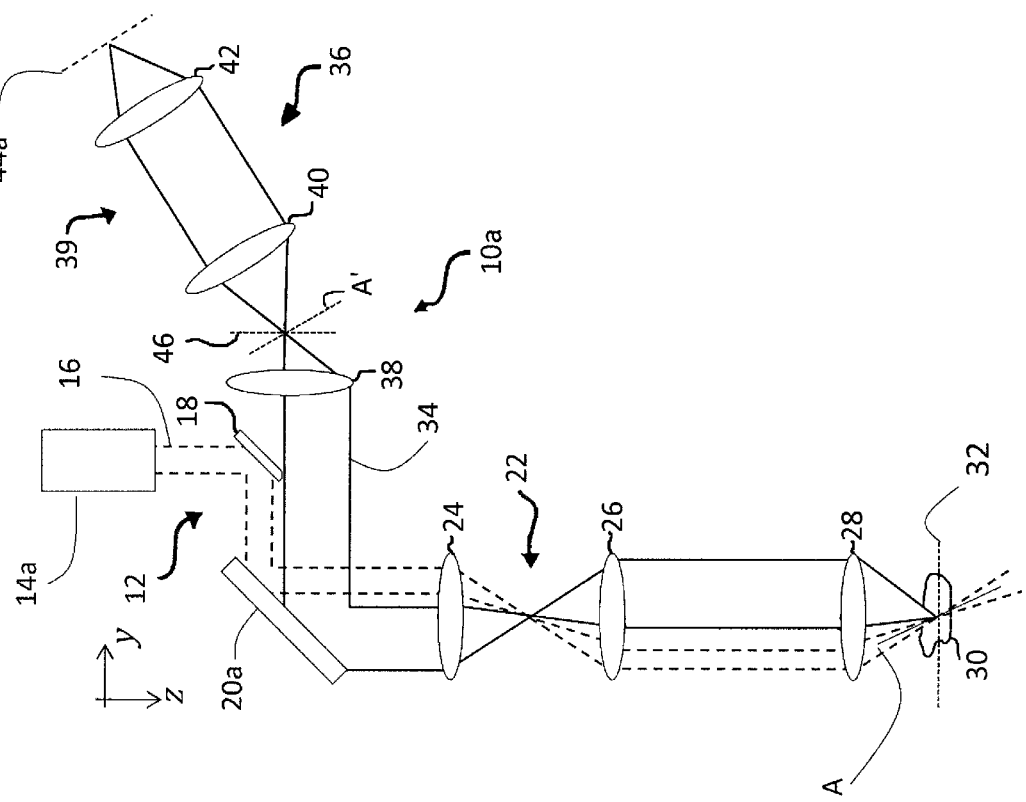
FIG. 1 a first embodiment of a microscope, to which the invention is applicable, in a y-z-sectional view.

In the FIGS. 1 and 2, a light-sheet microscope 10*a* is shown as a first embodiment. FIGS. 1 and 2 refer to an orthogonal coordinate system with axes x, y and z, wherein FIG. 1 shows a sectional view in the yz plane and FIG. 2 shows a sectional view in the xz plane.

The light-sheet microscope 10*a* has an illumination unit 12 with a beam source 14*a* which is designed to emit an illumination beam 16. In the present embodiment, the beam source 14*a* includes an anamorphic lens, such as a cylindrical lens, which forms the illumination light beam 16 into a light-sheet-like illumination light distribution, hereinafter simply referred to as a light sheet. Upon exiting the beam source 14a, the light sheet forms a flat light distribution aligned parallel to the y z plane. The technical realization according to the invention of the beam source 14a shown in FIGS. 1 and 2 (as well as the further beam sources in FIGS. 3 to 8) will be explained in detail below with reference to a number of exemplary embodiments with reference to FIGS. 9 to 37.

The beam source 14a emits the illumination beam 16 onto a deflection mirror 18 which reflects the illumination beam 16 in the direction of a 1 D scanning mirror 20a. The 1D scanning mirror 20a is designed, for example, as a galvanometer mirror or MEMS mirror and can be tilted about the x axis, which runs perpendicular to the plane of the drawing in FIG. 1, by means of a drive. Through this tilting, the 1D scanning mirror 20a displaces the illumination beam 16 in a direction parallel to the y axis. The 1D scanning mirror 20a is therefore referred to hereinafter as y scanning mirror.

They scanning mirror 20a reflects the illumination beam 16 towards the optics 22 composed of a scanning lens 24 and a tube lens 26 and forming a telescope. The optics 22 direct the illumination beam 16 onto an objective 28 which then illuminates a sample 30 with the illumination beam 16. For ease of illustration, sample 30 is shown only in FIG. 1.

The y scan mirror 20a is arranged in the illumination beam path so as to be in a plane conjugate to a rear focal plane of the objective 28. They scan mirror 20a, the optics 22 and the objective 28 thus form a telecentric system. The telescope comprising the lenses 24 and 26 is not absolutely necessary if the objective 28 is structurally designed such that the scanning mirror 20a can be placed directly in its pupil.

As shown in FIG. 1, the illumination beam 16 is incident on the y scanning mirror 20a in such a way that it is radiated into the objective 28 in an offset manner along the y axis. Accordingly, the illumination beam 16 illuminates only an off-center portion of the entrance pupil of the objective 28, whereby it propagates tilted within the sample 30 with respect to the optical axis of the objective 28. The illumination beam 16, which forms the light sheet and thus is flat, propagates in the sample volume along an illumination plane A and excites fluorescence there. The illumination plane A, which defines the area illuminated in the sample, is spanned by the illumination axis, i.e. the direction of propagation of the illumination beam 16, and the x axis (cf. FIG. 2). In FIGS. 1 and 2, reference numeral 32 denotes the sample-side focal plane of the objective 28.

By tilting the y scanning mirror 20a around the x axis, the illumination plane A, which is inclined relative to the optical axis, can be displaced parallel to the y axis in order to record image stacks within the sample 30.

The fluorescence radiation triggered by the illumination beam 16, hereinafter referred to as detection light 34, in turn enters the objective 28 which accordingly functions both as an illumination objective and as a detection objective. After passing through the optics 22, the detection light 34 falls onto the y scanning mirror 20a which reflects the detection light 34 in such a way that it passes through the deflection mirror 18 and enters an alignment optics 36. The device optics 36 contain two further objectives 38 and 40 and a tube lens 42, followed downstream by a surface detector 44a. By returning to the y scanning mirror 20a, the detection light 34 is descanned in the direction of they axis. This means that the scanning movement, mediated by the y-scan mirror 20a for the illumination beam 16, and by which the illumination plane A is moved, as it were, through the sample 30, is canceled by the return of the detection light 34 to the y scanning mirror 20a in the sense of an a counteraction. As a result, the illumination plane A is always imaged in a stationary manner on the surface detector 44a. Thus the image acquisition is carried out layer-wise, i.e. all the pixels of the surface detector 44a are illuminated simultaneously. The aforementioned components 20a, 22, 28, 36 and 44a form a detection unit generally designated as 39.

The device optics 36 have the function to image the illumination plane A onto a stationary plane A by way of an intermediate image. The plane A' is inclined relative to a plane 46 which is optically conjugating to the focal plane 32.

As shown in FIGS. 1 and 2 the two objectives 38 and 40 of the device optics 36 are arranged obliquely to one another. This oblique position of the objectives 38 and 40 causes the plane A' to be imaged on the surface detector 44 in the correct position. As explained above, the descanning effect of they scanning mirror 20a additionally ensures that the illumination plane A is imaged in a stationary manner on the surface detector 44 via the stationary intermediate image A.

At this point, it should be pointed out that the representation of the detection beam path in FIG. 2 which shows the xz sectional view, is greatly simplified. In fact, the part of the detection beam path lying between the y scanning mirror 20a and the objective 38 runs perpendicular to the plane of the drawing of FIG. 2, while the part of the detection beam path adjoining in the direction of the surface detector 44 extends obliquely out of the drawing plane in FIG. 2.

Figure 4:
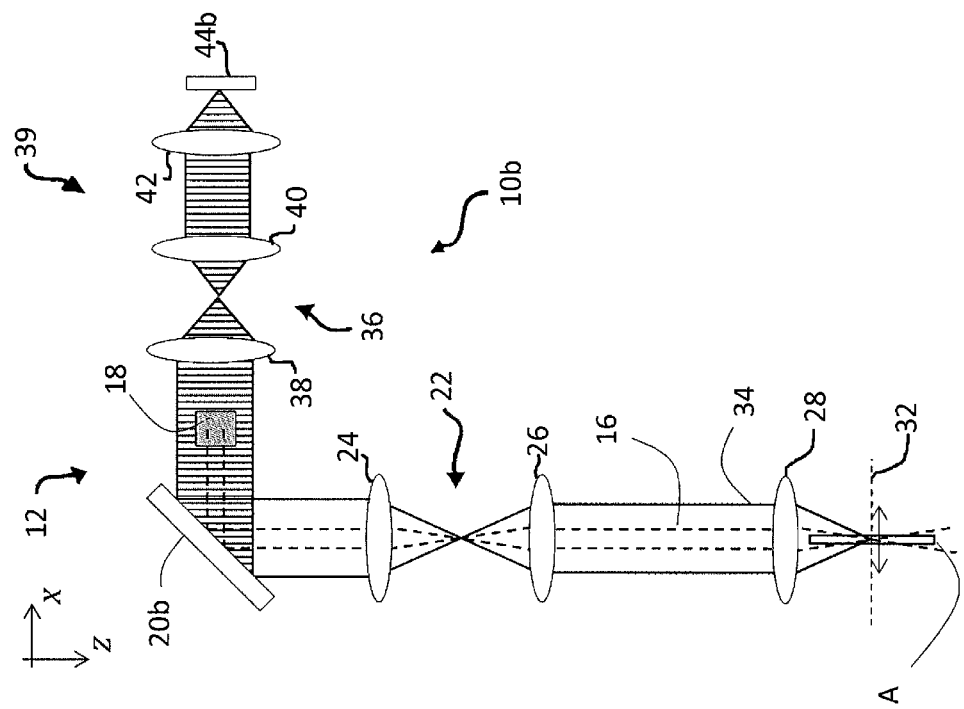
FIG. 4 the microscope according to the second embodiment in an x-z-section.
Figure 3:
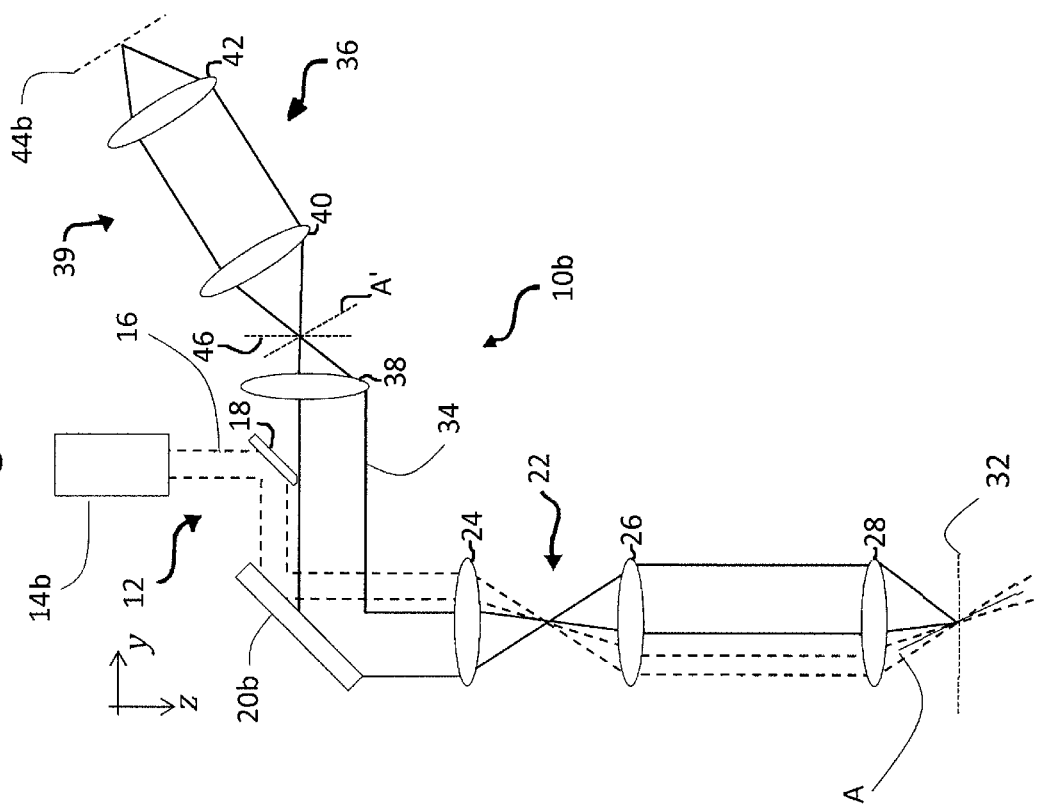
FIG. 3 a second embodiment of a microscope, to which the invention is applicable, in a y-z-section.

FIGS. 3 and 4 show a yz sectional view or an xz sectional view of a light-sheet microscope 10b, which represents a modification of the embodiment according to FIGS. 1 and 2 according to the invention.

The light-sheet microscope 10b is modified in comparison with the microscope 10a shown in FIGS. 1 and 2 such that the light-sheet-like illumination light distribution which, before entering the objective 28, represents a planar light distribution parallel to the xz plane, does not occur by means of anamorphic optics arranged in the beam source but is generated by means of a scanning mirror, which moves the illumination beam 16 in a direction parallel to the x axis and so, as it builds up a virtual light sheet. The light-sheet microscope 10b is realized in comparison with the embodiment shown in FIGS. 1 and 2 in the light-sheet microscope 10b according to FIGS. 3 and 4, by the fact that the beam source 14a is formed by a modified beam source 14b, the y scanning mirror 20a is replaced by a 2D scanning mirror 20b and the surface detector 44a is replaced by a line detector 44b. Incidentally, the functional components of the light sheet microscope 10b coincide with those of the previously described microscope 10a. These functional components are provided with the reference numerals used in FIGS. 1 and 2 and will not be explained again below. The same applies to all other figures that refer to each previously described figure.

The modified beam source 14b does not include anamorphic optics for light sheet generation. The construction of the light sheet is effected in the light sheet microscope 10b rather by the 2D scanning mirror 20b. This can be tilted both around the x axis and around the y axis and is referred to below as the xy scanning mirror. The tilting of the xy scanning mirror 20b around the y axis serves to construct the light sheet on the xz plane. In this respect, the xy scanning mirror 20b shown in FIGS. 3 and 4 performs the function which, in the light-sheet microscope 10a according to FIGS. 1 and 2, fulfills the anamorphic optics contained in the beam source 14a. In contrast, tilting the xy scanning mirror 20b around the x-axis again causes an offset of the illumination beam 16 along the y-axis. This offset is also used in the light-sheet microscope 10b, as in the embodiment according to FIGS. 1 and 2, to move the illumination plane A through the sample 30 and thus to enable a pickup of image stacks.

By returning the detection light originated from the sample to the xy scanning mirror 20b, descanning of the detection light 34 also takes place in the light-sheet microscope 10b. In contrast to the light sheet microscope 10a in which the detection light 34 is only scanned in the y axis direction, in the embodiment shown in FIGS. 3 and 4 the descanning takes place both in the direction of the y axis and in the direction of the x axis. Accordingly, in the light sheet microscope 10b, the surface detector 44a shown in FIGS. 1 and 2 is replaced by a line detector 44b. Thus, in the light sheet microscope 10b the image recording takes place by means of a confocal line detection.

The line detector 44b can also have more than one line, in particular if it includes a time delay integration (TDI) functionality in which the signal of the pixel lines is shifted synchronously with the image moved relative to the sensor and added up in order to avoid smearing artifacts.

Figure 5:
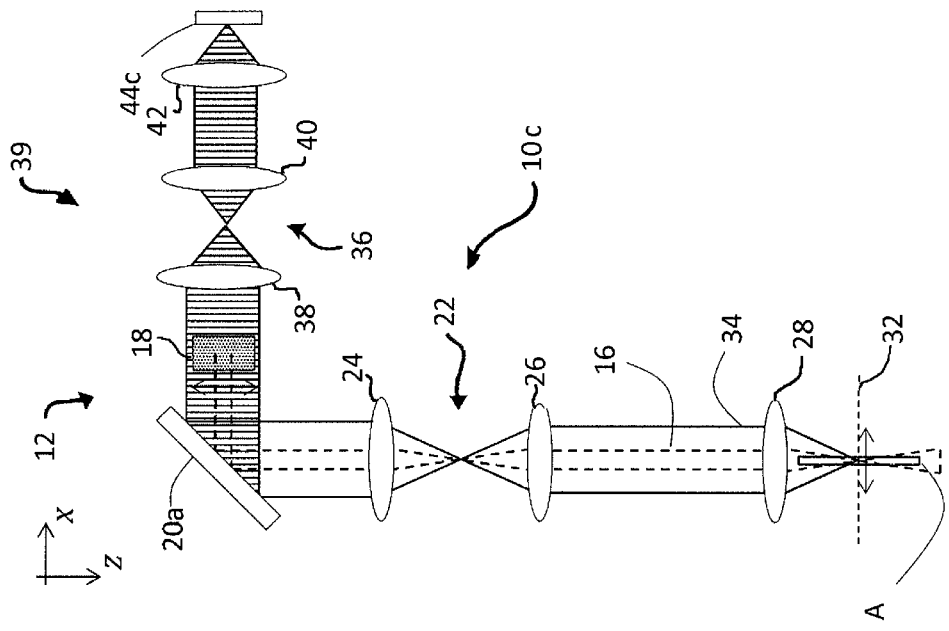
FIG. 5 a third embodiment of a microscope, to which the invention is applicable, in a y-z-section.
Figure 6:
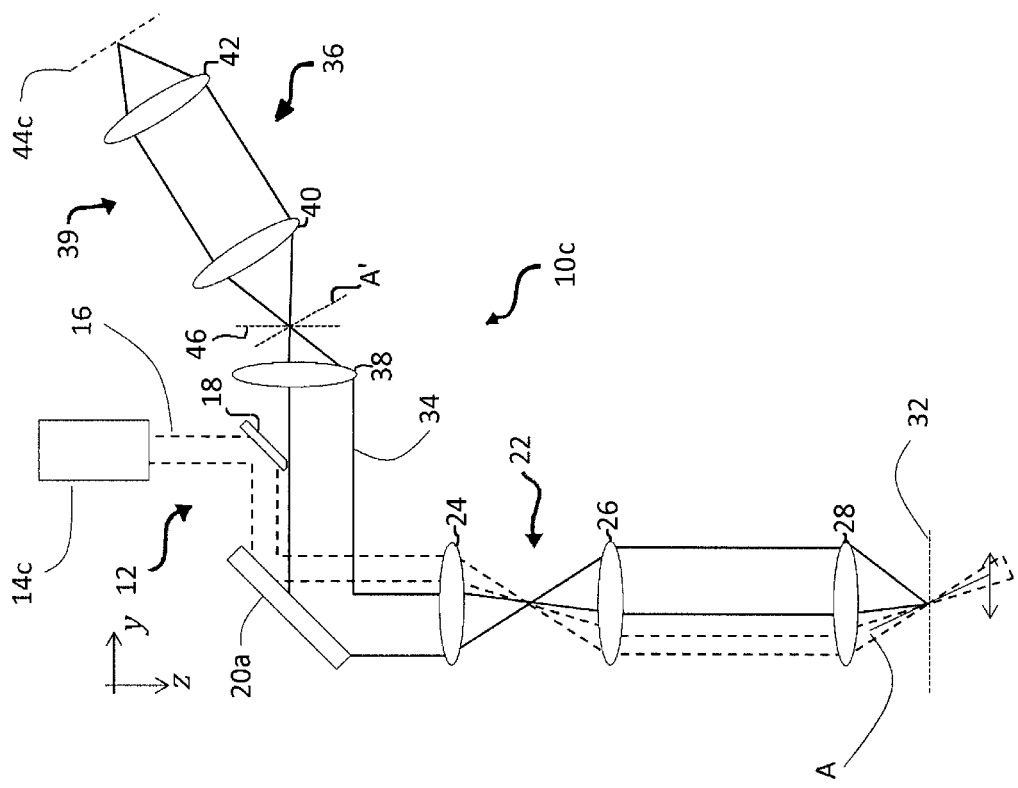
FIG. 6 the third embodiment of the microscope according to the third embodiment in an x-z-section.

FIGS. 5 and 6 show a light sheet microscope 10c as a further embodiment in a yz sectional view and xz sectional view, respectively. In comparison with the light-sheet microscope 10a shown in FIGS. 1 and 2, the modification according to FIGS. 5 and 6 is realized in that the beam source 14a is replaced by a modified beam source 14c and the surface detector 44a is replaced by a modified surface detector 44c.

While the beam source 14a has an anamorphic optical system for generating the light sheet lying parallel to the x-z plane in the light sheet microscope 10a. the modified beam source 14c of the light sheet microscope 10c has an x scanning mirror, which is not explicitly shown in FIGS. 5 and 6 and for this purpose tiltable around the y-axis. As in the embodiment shown in FIGS. 3 and 4, the illumination beam 16 in the x-z plane is therefore also moved in the light-sheet microscope 10c according to FIGS. 5 and 6 in order to build up a virtual light sheet.

However, in the light sheet microscope 10c of FIGS. 5 and 6, since the x-scanning mirror is arranged in the beam source 14c, it does not affect the detection light 34. The latter is therefore only fed back to the y-scanning mirror 20a which descans the detection light 34 in the direction of the y-axis. Descanning of the detection light 34 in the direction of the x-axis thus does not take place in the light-sheet microscope 10b. Accordingly, as in the case of the light-sheet microscope 10a shown in FIGS. 1 and 2, and in contrast to the light-sheet microscope 10b shown in FIGS. 3 and 4, a surface detector 44c is provided. In contrast to the light-sheet microscope 10a, which also has the surface detector 44a, line-by-line image recording by means of the surface detector 44c is possible in the light-sheet microscope 10c. This line-by-line image recording can be realized, for example, by the surface detector 44c having a rolling shutter function which is synchronized with the driving of the x scanning mirror contained in the beam source 14c.

Figure 7:
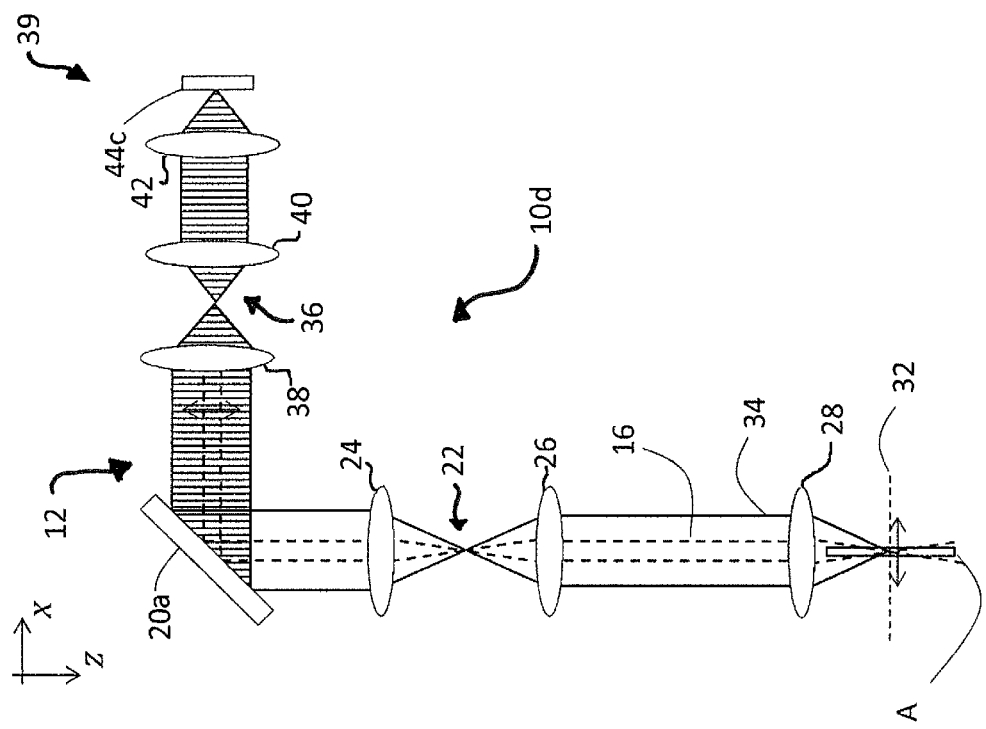
FIG. 7 a fourth embodiment of a microscope, to which the invention is applicable, in a y-z-section.
Figure 8:
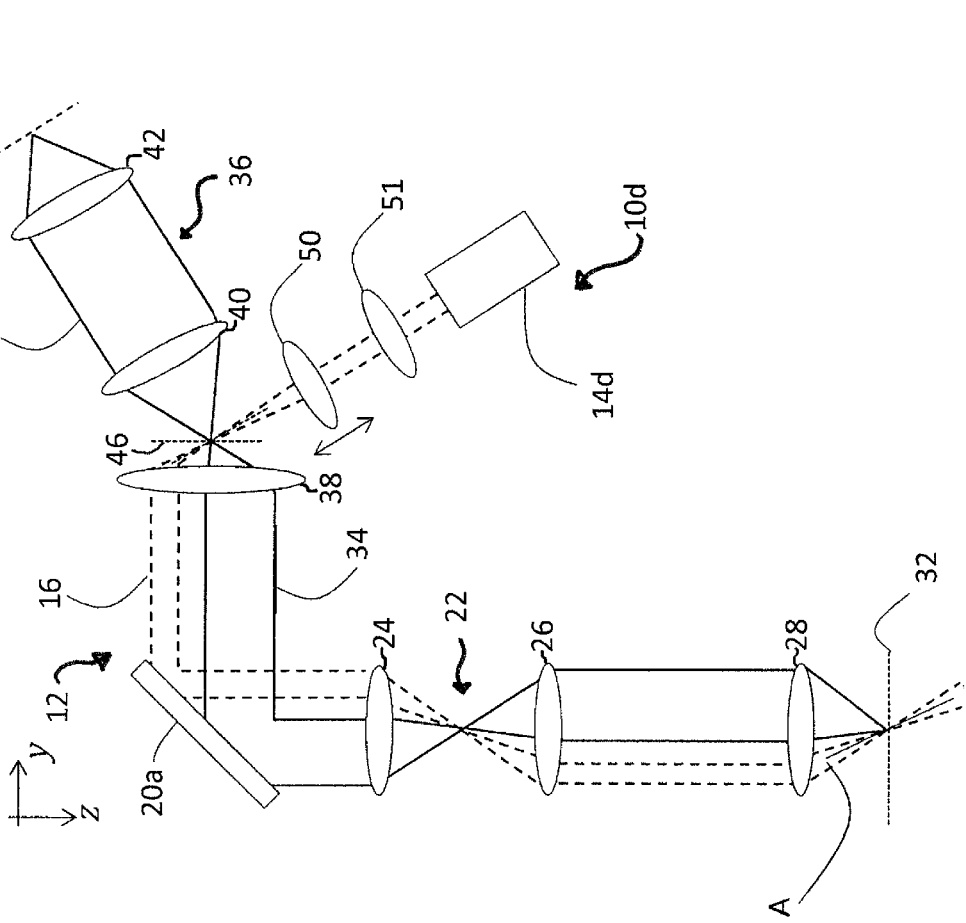
FIG. 8 the fourth embodiment of the microscope in an x-z-section.

FIGS. 7 and 8 show a light sheet microscope 10d as a further embodiment in a yz sectional view and an xz sectional view, respectively. The light-sheet microscope 10d represents a modification of the microscope 10c shown in FIGS. 5 and 6. This modification is that the beam source 14d, which has an x scanning mirror, as in the light-sheet microscope 10c, for setting up a virtual light sheet oriented parallel to the xz plane, emits the illumination beam 16 onto an additional illumination objective 50 which can be displaced along the optical axis of the illumination beam path for example by means of a piezo drive, as indicated by the double arrow in FIG. 7. The illumination objective 50 couples the illumination beam 16 into the illumination beam path in the area of the plane 46. As mentioned above, plane 46 is optically conjugated to focal plane 32. By moving the illumination objective 50 axially, the depth of focus area of the light sheet lying in the sample 30 shifts along the illumination plane A. There is a tube lens 51 between the illumination objective 50 and the beam source 14d.

Incidentally, the light-sheet microscope 10d substantially coincides with that in the above-explained embodiments.

In the following, various embodiments of beam sources according to the invention will be described, which can be used in the light microscope arrangements and corresponding arrangements shown in FIGS. 1 to 8.

FIG. 9 shows, in purely schematic representation, a beam source 68 which can be used, for example, as a beam source 14a in the light sheet microscope 10a according to FIGS. 1 and 2. In this embodiment, the beam source 68 includes a laser light source 52, a fiber coupling 54, a beam shaping optics 56 and a slit aperture 64 with variable aperture. The beam-shaping optics 56 comprises two mutually displaceable lenses 58, 60, which form a beam expander, and a cylindrical lens 62. The beam-shaping optics 56 is projected on the slit aperture 64.

Between the slit aperture 64 and the illumination objective 28, 4f systems can be arranged in any number, as indicated in FIG. 9 by the two lines designated as 65. By way of example, referring to the arrangement shown in FIGS. 1 and 2, such a 4f system can be used to project the slit aperture 64 to the y-scanning mirror 20a. The y-scanning mirror 20a is then imaged into the entrance pupil of the illumination objective 28 via another 4f system, which is formed in the FIGS. 1 and 2 from the optical system 22 comprising the scan lens 24 and the tube lens 26.

In the arrangement shown in FIG. 9, all optical elements 58 60 62 and 28 are arranged telecentrically, i.e. at a distance from the sum of their focal lengths.

The slit aperture 64 is arranged in the focus of the cylindrical lens 62 and thus in a plane conjugate to the pupil of the objective 28. It serves to adapt the effective numerical aperture of the illumination beam 16. Thus, the thickness and depth of focus of the light sheet can be adjusted via the slit aperture 64.

The embodiment according to FIG. 9 is to be understood purely by way of example and can be modified in many ways. It is thus possible, for example, to arrange a further slit aperture in the beam source 52 in a plane conjugate to the focal plane of the illumination objective 28. This further slit aperture then serves to laterally trim the light sheet and thus to adapt the width of the sample area illuminated by the light sheet to the width of the image field recorded by the surface detector 44a. With reference to FIG. 2, this means a trimming of the light sheet in the direction of the x-axis.

FIG. 10 again shows in purely schematic representation a beam source 70 which can be used, for example, as a beam source 14c in the light sheet microscope 10c according to FIGS. 5 and 6 or as a beam source 10d in the light sheet microscope 10d according to FIGS. 7 and 8.

While the beam source 68 shown in FIG. 9 has the cylindrical lens 62 for generating the light sheet, the beam source 70 shown in FIG. 10 for the purpose of generating the light sheet instead of the cylindrical lens 62 includes an x-scanning mirror 72 which (with reference to FIGS. 5 to 8) can be tilted around the y-axis, and a scan lens 74 downstream of the x scanning mirror 72. By tilting the x scanning mirror around the y-axis, the illumination beam 16 is moved in the x-z plane so as to construct a virtual light sheet. The lenses 58, 60, the x scanning mirror 72 and the scan lens 74 form a beam shaping optics 75.

Figure 11:
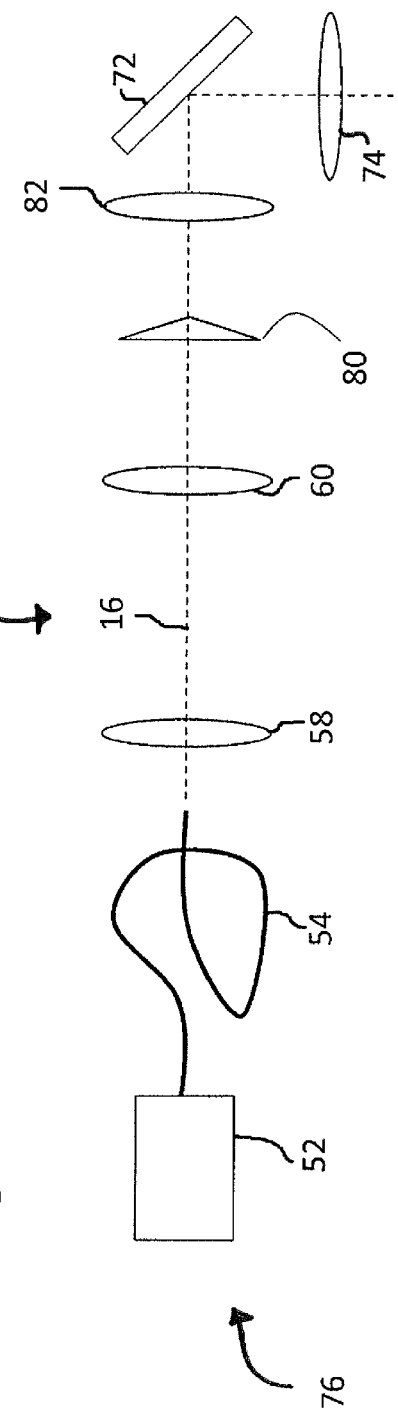
FIG. 11 a beam source according to an embodiment of the invention for generating a Bessel beam.

FIG. 11 shows a beam source 76 which represents a modification with respect to the beam source 70 shown in FIG. 10. The beam source 76 has a beam-shaping optics 78 which is designed to generate the illumination beam 16 in the form of a Bessel beam. For this purpose, the beam-shaping optical system 78 contains, in addition to the beam expander formed from the two lenses 58, 60, a convex axicon 80 and a further lens 82 downstream of the axicon 80. The axicon 80 can be used as refractive or diffractive component or as a hologram on a spatial light modulator or as a deformable mirror. The axicon 80 serves to change the phase of the illumination beam 16 depending on the distance from the optical axis. The mode of operation of the axicon 80 is illustrated in more detail in the schematic illustration according to FIG. 12.

Figure 12:
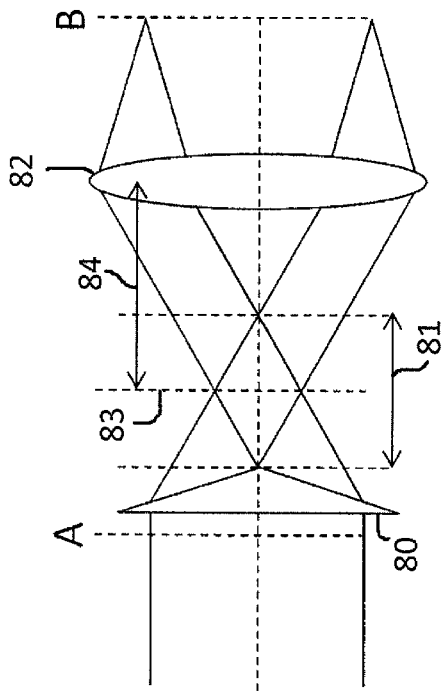
FIG. 12 a schematic representation showing the operation of a convex axicon used in the beam source of FIG. 11.

In the illustration in FIG. 12, a double arrow 81 designates a diamond-shaped region within which the intensity maximum of the Bessel beam generated by the axicon 80 is located. Another double arrow 84 indicates the rear focal length of the lens 82. Accordingly, a rear focal plane 83 of the lens 82 lies in the center of the diamond-shaped area 81. This is imaged by the lens 84 in order to bring the intensity maximum of the Bessel beam into the focal plane of the illumination objective. The diamond-shaped area 81 shown in FIG. 12 thus represents the depth of focus of the Bessel beam. In order to make the axial profile of the Bessel beam symmetrical, i.e. to homogenize the beam profile, in the plane indicated by B in FIG. 12, a ring aperture can be arranged.

Figure 13:
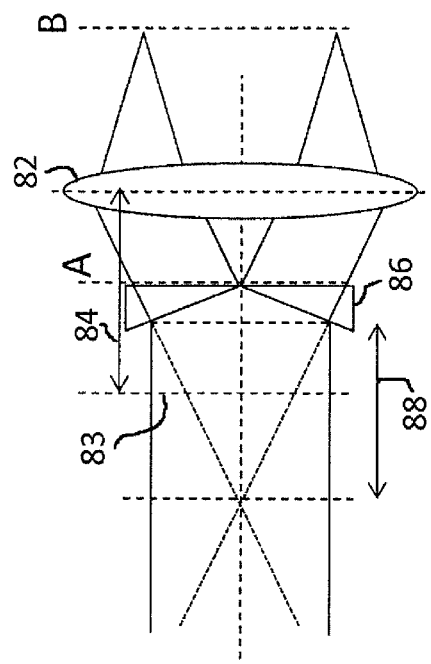
FIG. 13 a schematic representation showing the operation of an alternative usable concave axicon.

FIG. 13 shows an alternative embodiment in which a concave axicon 86 is used in place of the convex axicon 80. The concave axicon 86 generates a virtual Bessel beam, whose intensity maximum lies within the range designated 88 in FIG. 13. There is again the rear focal plane 83 of the lens 86. The concave design of the axicon 86 enables a particularly space-saving arrangement.

FIGS. 14 to 16 show different aperture arrangements which can be used in the beam source 76 of FIG. 11 in cooperation with the convex axicon 82 (see FIG. 12) or the concave axicon 86 (see FIG. 13) to create a trimmed Bessel beam.

FIG. 14 shows an aperture 94 in a top view of the optical axis O, wherein the aperture 94 is arranged in the representations according to FIG. 12 or 13 on plane A or plane B. The aperture 94 is formed by two aperture parts 96 and 98, each having the geometric shape of a triangle. The aperture parts 96 and 98 face each other in such a way that the tips of their triangular shapes lie on the optical axis O in the plan view according to FIG. 14. An angle β shown in FIG. 14 is a measure of the aperture utilized by the axicons 80 and 86, respectively.

FIG. 15 shows, in an alternative embodiment, a slit aperture 100 formed of two rectangular aperture parts 102 and 104. The two aperture parts 102 and 104 are arranged at a distance from one another symmetrically to the optical axis O, thus forming a gap within which the Bessel beam propagates. The angle β in turn identifies the aperture used by the axicons 80 and 86, respectively. The slit aperture 100 is arranged in the plane B in the arrangements shown in FIGS. 12 and 13. A trimmed Bessel beam is generated by the slit aperture 100 by means of an annular light distribution.

FIG. 16 shows, in a further alternative embodiment, a aperture 106 formed of a one-piece rectangular aperture part arranged on the optical axis O. Thus, the aperture 106 blocks an axis near part of the light distribution formed by the Bessel beam. Accordingly, the trimmed Bessel beam is generated by an off-axis portion of the light distribution passing above and below the aperture 106 in FIG. 16. Thus, the trimmed Bessel beam again produces an annular light distribution.

The aperture 106 is arranged in the arrangements according to the FIGS. 12 and 13 respectively in the plane B. The angle β again designates the aperture used by the axicon 80 or 86.

FIG. 17 shows a beam source 108 which can be used, for example, in the light-sheet microscope 10c shown in FIGS. 5 and 6 as beam source 14c or in the light-sheet microscope 10d shown in FIGS. 7 and 8 as beam source 14d.

The beam source 108 according to FIG. 17 is designed to generate the illumination beam 16 in the form of a Mathieu beam. For this purpose, the beam source 108 has a beam-shaping optics 110 which differs, for example, from the beam-shaping optics 78 used in the beam source 76 according to FIG. 11 in that the beam expander formed by two lenses 110 and 112 is formed anamorphic, i.e. has different magnifications along two axes perpendicular to the optical axis. Consequently, the illumination beam 16 emerging from the anamorphic beam expander falls onto the axicon 80 in the form of an elliptical Gaussian beam. This elliptical Gaussian beam is formed by the axicon 80 to a Mathieu beam, which can then be used in a manner already explained for generating light sheets.

Figure 18:
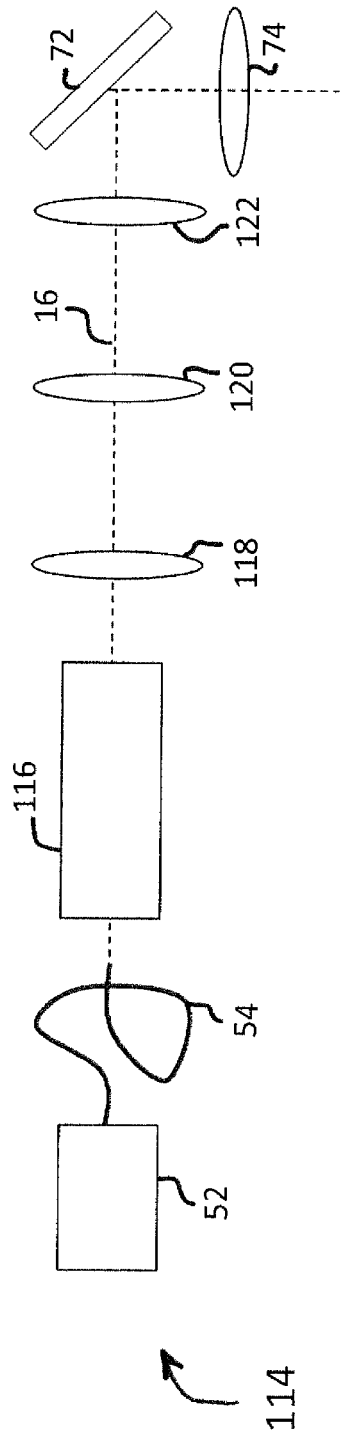
FIG. 18 a beam source according to the invention for generating an illumination beam with axially displaceable depth of focus area.

FIG. 18 shows another beam source 114 which is designed to shift the depth of focus area of the illumination beam 16 within the sample. In this respect, the embodiment according to FIG. 18 is an alternative to the solution shown in FIG. 7, in which the displacement of the depth of focus area of illumination beam 16 by means of the illumination objective 50 takes place. Thus, while the displacement of the depth of focus area is achieved there via a provided outside of the beam source component, this technical function is realized by the beam source 114 itself in the embodiment of FIG. 18.

In addition to the components already explained, such as the laser light source 52, the fiber coupling 54, the y-scanning mirror 72 and the scan lens 74, the beam source 114 includes a beam shaping optic 116 as well as a lens arrangement formed of three lenses 118, 120 and 122 which is arranged downstream of the beam shaping optics 116. Optionally, one of the optics exemplified in FIGS. 9 to 17 can be used as beam-shaping optics 116. In particular, the beam-shaping optics 116 can thus be designed in such a way that they shape the illumination beam 16 into a Bessel beam, a trimmed Bessel beam or a Mathieu beam. However, the beam shaping optics 116 are not limited to generating the aforementioned beam types. In particular, the beam-shaping optics 116 can also be designed to produce a conventional Gaussian beam.

The lens arrangement downstream of the beam shaping optics 114 is selected so that the two lenses 118 and 122 are positioned along the optical axis at a distance of the sum of their focal lengths. That is, between the two lenses 118 and 122 is a plane having a distance from both the lens 118 and the lens 122 that is identical to the focal length of the respective lens 118 and 122, respectively. In this plane, which accordingly forms a common focal plane, the central lens 120 is arranged. The lens 120 is designed as a tunable lens, i.e. as an optical element whose optical effect is variably controllable. For example, the tunable lens 120 can be realized as an elastomer lens whose surface curvature is variable by external actuation, so that the focal length of the lens is controllable. By appropriately controlling the tunable lens 120, the illumination beam 16 can be made convergent or divergent as desired, resulting in a corresponding change in the depth of focus area.

With the aid of the beam source 114, the depth of focus area of the illumination beam 16 can be controlled in such a way that the light sheet generated within the sample can be varied in terms of shape, extent and position. Thus, in conventional arrangements, the depth of focus area of the illumination beam is usually adjusted to illuminate the entire field of view. This means that the depth of focus area range usually corresponds to the extent of the image along the optical axis. In contrast, the beam source 114 shown in FIG. 18 can be controlled in such a way that the illumination beam 16 is more focused, i.e. a smaller depth of focus area is chosen, so that the resulting light sheet becomes thinner in the area of its waist, while it diverges more strongly away from the waist, i.e. becomes thicker. Preferably, only detection light is then detected on the detector side, which originates from a sample strip which is illuminated by the waist of the light sheet.

Figure 19:
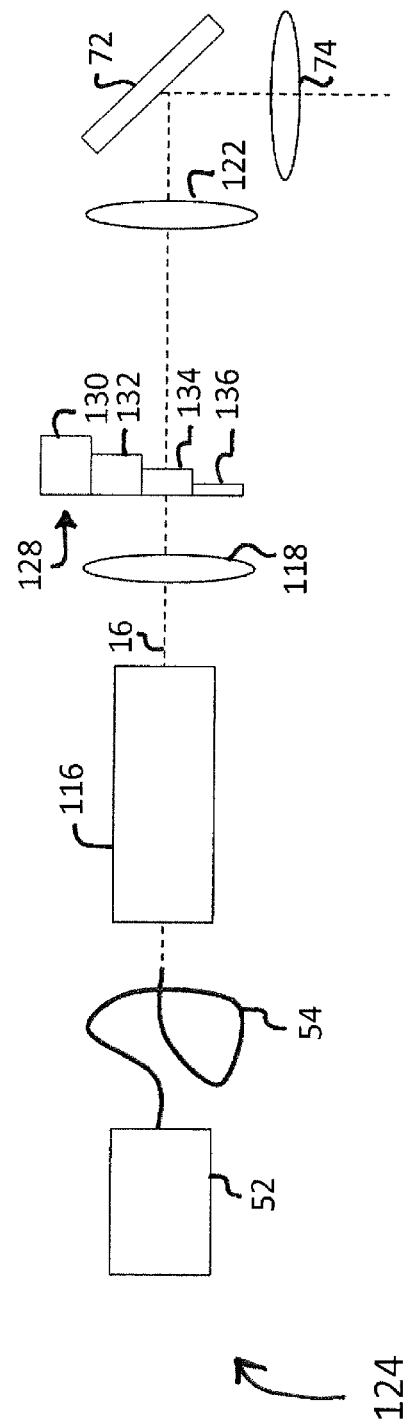
FIG. 19 an alternative beam source for generating an illumination beam with axially displaceable depth of focus area.

FIG. 19 shows a beam source 124 which represents an embodiment modified from the arrangement according to FIG. 18 for shifting the depth of focus area of the illumination beam 16. Instead of the tunable lens 120 provided in FIG. 18, the beam source 124 includes a disc 128 which can be displaced perpendicular to the optical axis and which comprises a plurality of transparent blocks 130, 132, 134 and 136. The transparent blocks 130 to 136 have different thicknesses along the optical axis. The disk 128 is displaceable by means of a corresponding drive perpendicular to the optical axis, so that optionally one of the transparent blocks 130 to 136 is introduced into the beam path of the illumination beam 16. Due to their different axial thicknesses, the transparent blocks 130 to 136 affect the optical path length of the illumination beam 16 in different ways. This varying influence on the optical path length can be used to shift the depth of focus area of the illumination beam and thus the waist corresponding to the depth of focus area of the resulting light sheet within the sample.

In the beam source 124 of FIG. 19, the two lenses 118 and 122 are spaced apart so as to form approximately a telecentric system. To be precise, the distance between the two lenses 118, 122 is chosen to be slightly larger than sum of the focal lengths of the lenses 118, 122. The distance is just such that that in the event that a transparent medium-thickness block, e.g. block 134, is located in the beam path of the illumination beam 16, the illumination beam 60 entering in collimated form into the lens 118 also exits from the lens 122 in collimated form. On the other hand, if one of the two thicker blocks 130, 132 is in the beam path, then the illumination beam 16 diverges as it exits the lens 122. In contrast, it emerges as a convergent light beam from the lens 122 when the thinner block 136 is introduced into the beam path.

The disk 128 provided with the transparent blocks 130 to 136 is located in a region of the beam path in which the illumination beam 16 is divergent or convergent, in any case not collimated.

The implementation illustrated in FIG. 19 for influencing the optical path length of the illumination beam 16 is only to be understood as an example. For example, the transparent blocks 130 and 136 may be arranged in a correspondingly modified implementation, for example on a disc which is rotatable around the optical axis, so as to selectively introduce one of the blocks in the beam path in this way.

FIGS. 20 and 21 show pupil representations illustrating the advantage of using a Bessel beam, a trimmed Bessel beam and a Mathieu beam versus the use of a Gaussian beam. In this case, in the example according to FIGS. 20 and 21 it is assumed that the respective illumination beam is radiated into the objective pupil 302 in an offset manner along the x-axis and accordingly illuminates only an off-center partial area of the objective pupil 302. This offset in the x direction determines the tilting of the resulting sheet plane relative to the optical axis.

Those regions of the objective pupil 302 which are assigned to the illumination aperture 304 and the detection aperture 306 are shown in FIGS. 20 and 21 and are respectively represented for the different beam types. The pupil area defined by the illumination aperture 304 is referred to as detection pupil in the further illumination pupil and the pupil area defined by the detection aperture 306.

FIG. 20 shows a Bessel beam 300a as it is placed at the edge of the objective pupil 302 in such a way that the illumination pupil and the detection pupil completely utilize the extension of the objective pupil 302 in the x direction. The length of the arrow indicates the maximum illumination aperture. FIG. 21 shows the same situation for a trimmed Bessel beam or a Mathieu beam 300b, wherein in FIG. 21 the maximum illumination aperture 310 for a Gaussian beam is also indicated for comparison. As can be seen from the illustration of FIG. 21, a trimmed Bessel beam or Mathieu beam 300b can be placed closer to the edge of the objective pupil 302 with the illumination aperture. In other words, with a larger illumination aperture, an overlap of the illumination pupil with the detection pupil can be avoided. As a result, either a larger detection aperture or a larger illumination aperture can be used.

Figure 22:
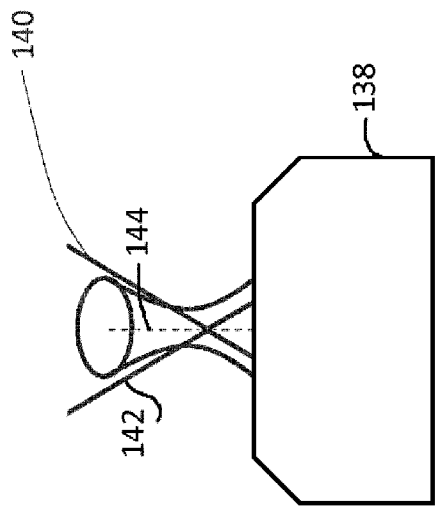
FIG. 22 a schematic sectional view showing the overlap between the illumination beam and a detection cone when a Gaussian beam.
Figure 23:
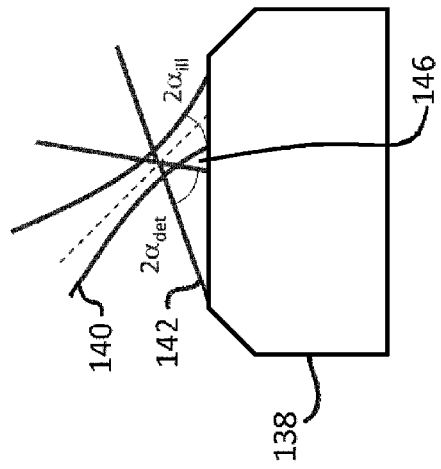
FIG. 23 the overlap between the illumination beam and the detection cone when using a Gaussian beam in another sectional view.
Figure 24:
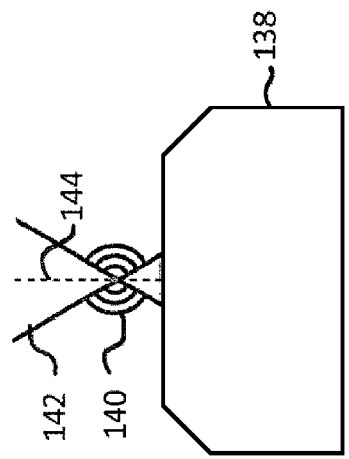
FIG. 24 a schematic sectional view showing the overlap between the illumination beam and the detection cone using a trimmed Bessel beam or a Mathieu beam.
Figure 25:
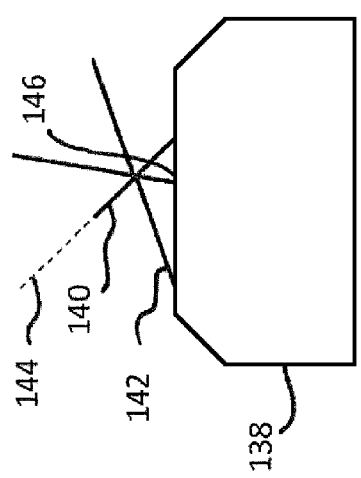
FIG. 25 the overlap between the illumination beam and the detection cone when using a trimmed Bessel beam or a Mathieu beam in another sectional view.

The advantage resulting from illumination with a Bessel beam, in particular a trimmed Bessel beam and a Mathieu beam, with respect to illumination with a Gaussian beam is illustrated once again in FIGS. 22 to 25. In this case, FIGS. 22 and 23 show illumination with a Gaussian beam in two sectional views perpendicular to each other, while FIGS. 24 and 25 in corresponding sectional views illustrate illumination with a trimmed Bessel beam or a Mathieu beam.

In FIGS. 22 to 25, a respective objective 138 and the respective cross section of an illumination beam 140 and a detection cone 142 are shown. The illumination beam 140 is a Gaussian beam in FIGS. 22 and 23 and a trimmed Bessel beam or Mathieu beam in FIGS. 24 and 25.

The illumination is advantageously to be selected such that the overlap of the respective illumination beam 140 with the detection cone 142 is restricted to the smallest possible area around the plane to be imaged, which is indicated in the FIG. 22 by the dashed line designated by 144. In particular, in FIGS. 22 and 25 the region in which an overlap between the illumination beam 140 and the detection cone 142 is to be avoided is designated by 146.

As a review of FIGS. 22-25 shows, the aforementioned overlap between the illumination beam 140 and the detection cone 142 is significantly less when using a trimmed Bessel beam or a Mathieu beam than when using a Gaussian beam. Thus, there is significantly more allowance for a trimmed Bessel beam or a Mathieu beam to increase the detection aperture. In this case, the detection aperture $NA_{det} = n\, \alpha_{det}$ is determined, wherein the aperture angle $2\alpha_{det}$ of the detection cone 142 is indicated only in FIG. 22 in terms of simplifying the illustration. FIG. 22 also shows the angle which represents a measure of the illumination aperture. The apertures of illumination and detection are limited by the aperture angle of the lens α with NA=n sin α over 2α=2α$_{ill}$+2α$_{det}$.

Embodiments are described which aim at compensating for losses in detection light which occur due to scattering and absorption as the penetration depth of the illumination beam into the sample increases. Thus, in conventional microscopy, in which the illuminated plane coincides with the focal plane of the detection objective, such losses of illumination light over the image field are relatively low. In contrast, in a light sheet microscopic method such as OPM or SCAPE for a single image, the detection light is acquired from very different depths within the sample. In this case, it may be necessary to compensate for the increasing losses of illumination light as a result of scattering and absorption, as the light penetration depth increases.

Figure 26:
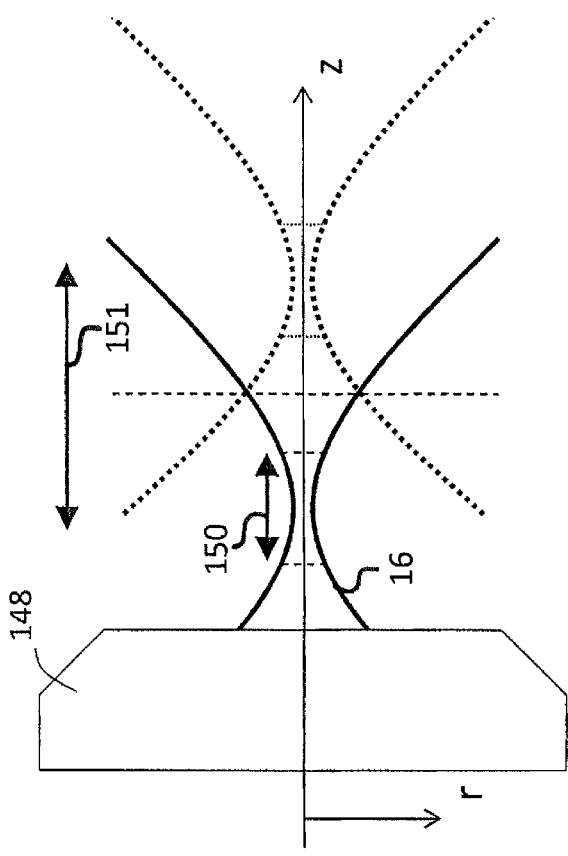
FIG. 26 a schematic representation showing an axial depth of focus area of the illumination beam.

FIGS. 26 to 29 illustrate by way of example how a compensation of the attenuation and/or absorption caused by scattering and/or absorption can be achieved by means of a displacement of the depth of focus area of the illumination beam 16, as is possible by means of the arrangements shown in FIGS. 4, 18 and 19 Illumination beam 16 can be achieved depending on the light penetration. FIG. 26 shows an objective 148 through which the sample is illuminated with the illumination beam 16. The illumination beam 16 has a depth of focus area 150, the extent of which along the illumination axis z in FIG. 26 is indicated by a double arrow. Within the depths of field 150 is the focal plane of the objective 148 designated 152 in FIG. 26.

Figure 27:
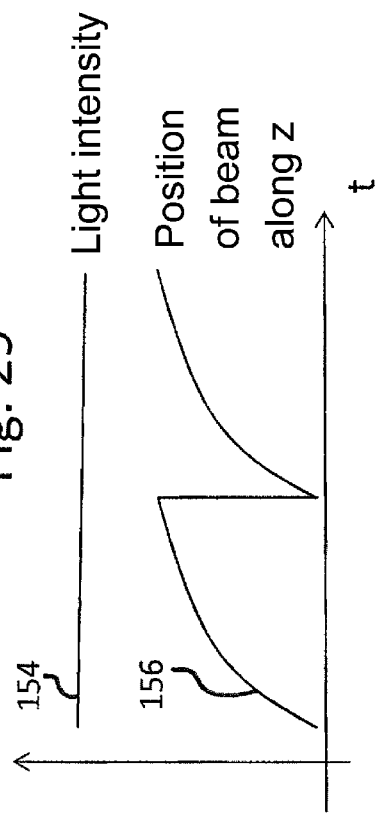
FIG. 27 a schematic representation illustrating the inventive displacement of the depth of focus area of the illumination beam.

FIG. 27 shows, on the one hand, how the depths of field 150 along the illumination axis z can be shortened by a stronger focusing of the illumination beam 16. Accordingly, the thickness of the illumination beam 16 measured in the radial direction r, i.e. perpendicular to the illumination axis z, also decreases. This results in a clearly thinner light sheet with a shorter depth of focus.

FIG. 27 shows, on the other hand, how the depth of focus area 152 can be displaced along the illumination axis z in order to vary the depth of penetration in which the light sheet illuminates the sample. The area within which the focus depth region 150 is displaced along the illumination axis z is indicated in FIG. 27 by double arrow 151 designated by 151.

Figure 28:
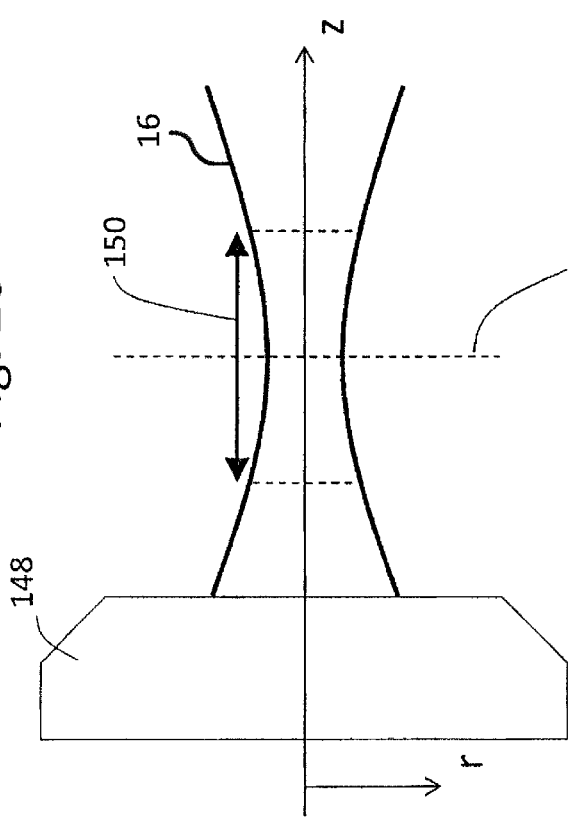
FIG. 28 a schematic representation illustrating the inventive variation of the intensity of the illumination light beam as a function of the position of the depth of focus area.

FIG. 28 shows an example of how the axial displacement of the depth of focus area 150 can be used for attenuation compensation. In FIG. 28, a curve 154 indicates the intensity of the illumination beam as a function of time t. In contrast, the curve below, designated 156, denotes the position of the depth of focus area 150 along the illumination axis z as a function of time t, with an increase in the curve 156 corresponding to a shift of the depth of focus area 150 in FIG. 27 from left to right.

As shown by curve 156 in FIG. 28, in the present example, the depth-of-field 150 is first moved from a constant velocity start position along the illumination axis z away from the objective 148 to an end position, then reset to its initial position from that end position, and then moved back from the initial position with the same constant speed in the end position. In this case, in FIG. 27, the depth of focus area 150 in the initial position is indicated by solid lines and in the end position by dashed lines.

According to the curve 154, the intensity of the illumination beam 16 is increased while the depth-of-field region 150 is moved from its initial position along the illumination axis z to its final position. In the example of FIG. 28, the intensity increases exponentially. This exponential increase in intensity reflects the so-called Lambert Beer law, which describes the attenuation of the intensity of electromagnetic radiation when passing through a medium with an absorbing and/or scattering substance as a function of the concentration of this substance and the penetration depth. In a simpler implementation, however, a linear increase in intensity of the illumination beam can also be provided.

The increase or, in general, the modulation along z can be adapted in particular iteratively and adaptively to the object in such a way that the signal strength in the image is uniform along z. In this case, e.g. at least one (raw) image is evaluated in order to then adjust the beam profile in a suitable manner and to produce a final optimized image and store it for the user.

Figure 29:
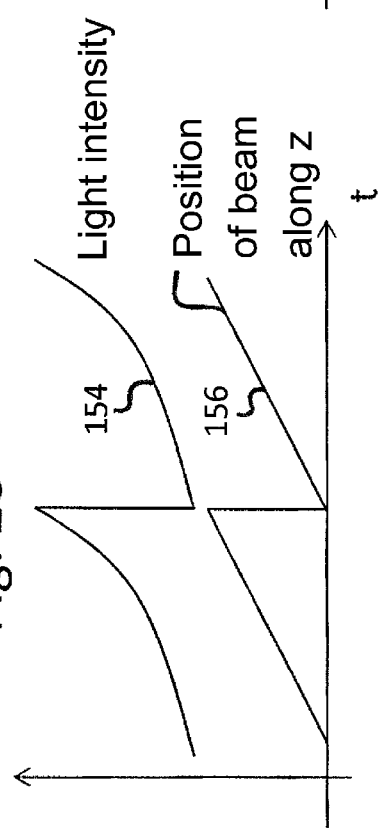
FIG. 29 a schematic representation illustrating the inventive variation of the displacement speed of the depth of focus area of the illumination light beam depending on its position.

In order to set the intensity profiles shown in FIGS. 28 and 29, the laser light source which emits the illumination beam 16 is controlled in a time-dependent manner.

FIG. 29 shows a modified exemplary embodiment for attenuation compensation. As the curve 154 in FIG. 29 shows, in this exemplary embodiment the intensity of the illumination beam 16 is kept constant over the entire displacement movement of the depth-of-field 150. In contrast, the speed at which the illumination beam 16 is moved along the illumination axis z is varied. Specifically, the displacement speed decreases with increasing penetration depth. This means that the dwell time of the illumination beam 16 increases with the penetration depth, as a result of which deeper-lying sample areas are illuminated more intensely.

Figure 30:
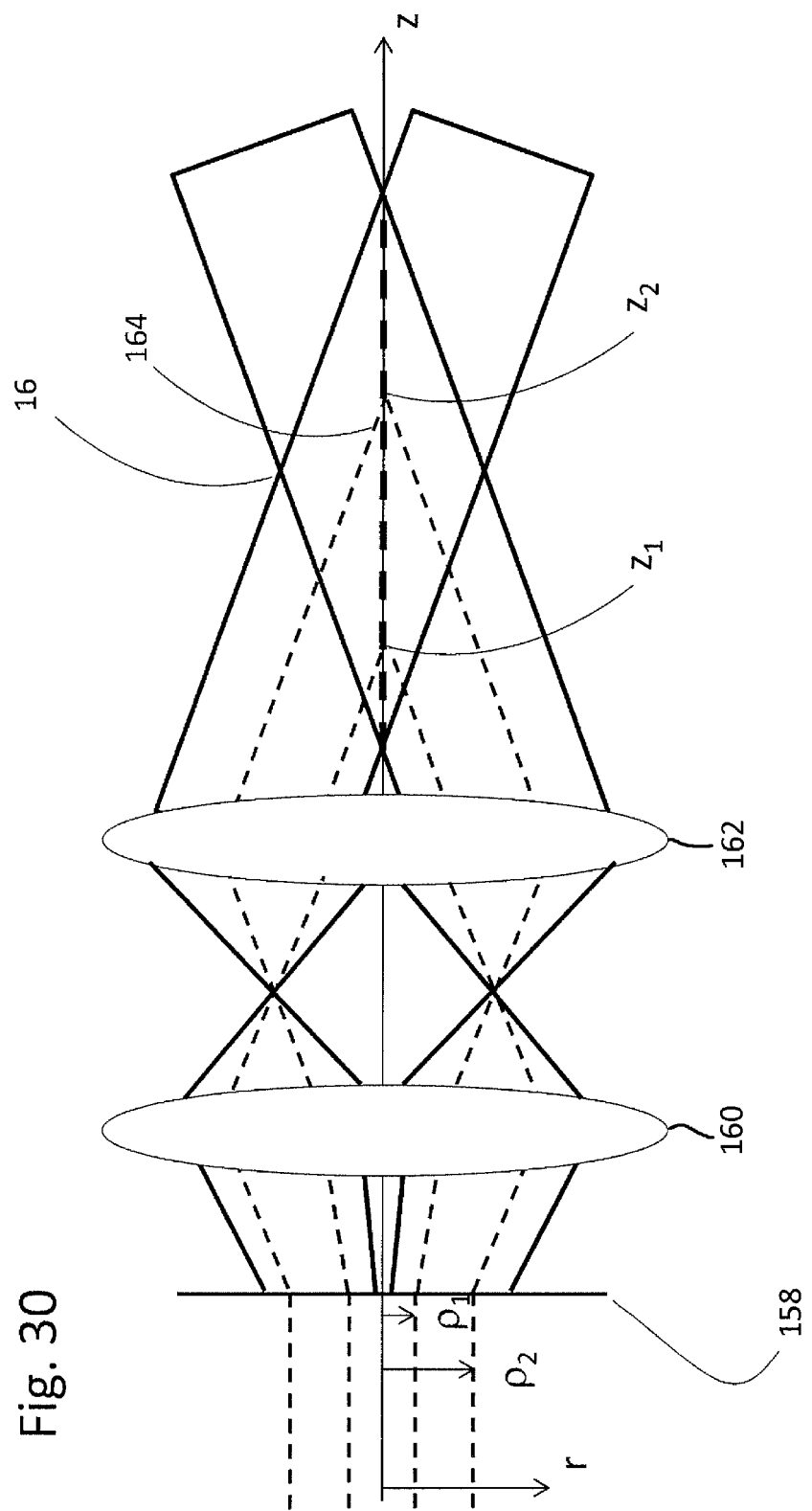
FIG. 30 a schematic representation to illustrate how the axial intensity for attenuation compensation can be controlled by influencing of the radial profile of the illumination beam according to the invention.

FIG. 30 illustrates how, by influencing the radial profile of the illumination beam 16, its intensity along the illumination axis z for absorption compensation can be controlled. In this case, the illuminating beam 16 used is preferably a Bessel beam, a trimmed Bessel beam or a Mathieu beam. For generating the desired beam shape, for example, a convex axicon may be positioned in a plane 158. As FIG. 30 shows, a lens 160 and an objective 162 are arranged downstream of this plane 158. Between the lens 160 and the objective 162, any number of telecentric optics and beam deflecting means may be arranged.

In order to influence the radial profile of the illumination beam 16, by suitable means, for example, a mask provided with ring segments of different transmission, the transmission of the illumination beam 16 can be varied as a function of the radial distance r from the illumination axis z so that the intensity of the illumination beam 16 along the illumination axis z is set in the desired manner. If, for example, the transmission is selected such that it is greater at a radial distance ρ1, which is assigned a position z2 on the illumination axis z than at a larger radial distance ρ2, which is assigned a position z1 on the illumination axis, then the intensity of the illumination beam 16 in the axial position z2 are increased from the intensity in the position z1. In this case, diffraction effects have to be considered as well as the fact that a ring with ring width dρ has an area A=2πρ dρ which therefore increases ρ with it. For a uniform intensity of the illumination beam on the optical axis, the transmission of the ring segments must therefore decrease to the outside. Taking into account the light loss occurring due to scattering and/or absorption, the radial profile of the illumination beam can thus be adjusted by means of a suitable transmission-controlling mask in such a way that the axial intensity of the illumination beam 16 increases along the illumination axis z to such an extent that the light losses increasing with the penetration depth are compensated.

The illumination illustrated in FIG. 30 by means of a Bessel beam, a trimmed Bessel beam or a Mathieu beam is particularly useful in connection with confocal line detection.

FIG. 31 shows a beam source 168 by means of which the illumination principle illustrated in FIG. 30 is implemented by way of example. The beam source 168 according to FIG. 31 has, in addition to the laser light source 52, the fiber coupling 54 and the beam expander formed by the two lenses 58, 60, the lens 160, which is also shown in FIG. 30, and a spatial light modulator 170, which has been described above with reference to FIG. 30 mentioned axicon is realized together with the radial beam profile controlling mask. Instead of the spatial light modulator 170 a free-form lens can also be used whose radius of curvature varies with the radial distance r in order to control the axial intensity of the illumination beam 16 as desired.

FIG. 32 shows a beam source 172, which represents an embodiment modified from the arrangement according to FIG. 31 for realizing the illumination principle illustrated in FIG. 30. The beam source 172 has two spatial light modulators 174 and 176, of which the first light modulator 174 serves to generate a suitable illumination for an axially increasing beam profile on the second light modulator 176. In this case, the first light modulator 174 modulates the phase of the illumination beam such that the amplitude of the illumination beam 16 on the second spatial light modulator varies as desired as a function of the radial distance from the illumination axis. The second spatial light modulator 176, with reference to the FIG. 30, which is between the lens 160 and the objective is 162, is again formed by an axicon, for example. Starting from the second light modulator 176, the illumination beam 16 propagates, for example, via a scanning mirror to the illumination objective.

FIG. 33 shows a beam source 178 which is modified in relation to the embodiment in FIG. 32 in that instead of the two separate light modulators 174, 176, a single spatial light modulator 178 is provided which has two modulator regions 180 and 182, of which the first modulator section 180 assumes the function of the first light modulator 174 and the second modulator section 182 assumes the function of the second light modulator 176.

The illumination beam 16 first strikes the first modulator section 180, then passes through the lens 160 and is reflected at a mirror 184 towards the second modulator section. Starting from the second modulator section 182 the illumination beam 16 propagates to a further mirror 186 which reflects the illumination beam 16 e.g. via a scanning mirror in the direction of the illumination objective.

FIGS. 34 and 35 show an embodiment in which a rolling shutter function surface detector 188 comes into effect. The FIG. 34 shows the arrangement in an x-y section and the FIG. 35 in a y-z section. In the embodiment according to FIGS. 34 and 35, separate objectives are provided for illumination and detection, namely an illumination objective 190 focusing the illumination beam 16 into the sample and a detection objective 192 arranged with its optical axis perpendicular to the optical axis of the illumination objective 190. The arrangement shown in FIGS. 34 and 35 further comprises a device unit 194 downstream of the detection objective 192 and a tube lens 196 upstream of the surface detector 188.

In the embodiment according to FIGS. 34 and 35, the illumination beam 16 is moved transversely to the illumination axis z along the x-axis. Accordingly, the sample is illuminated along a z-axis extending strip which is moved in opposite directions along the x-axis. As a result, that the detection light 34 on the surface detector 188 generates a corresponding strip, extending in the direction of the z axis and moves along the x axis across the surface detector 188.

The surface detector 188 has a rolling shutter function, i.e., it is designed such that only one strip-shaped region 198 of the surface detector 188, which extends in the direction of the z axis, is activated at a given point in time and thus is effective for detection. The surface detector 188 is driven so that its actively switched strip-shaped area 198 is moved along the x axis synchronously with the detection light strip falling on the surface detector 188.

The surface detector 188 can be controlled such that the strip-shaped area 198, which realizes its rolling-shutter function, has a width of only a single pixel in the direction of the x axis. In this case, the surface detector 188 acts as a line detector (moving in the x axis direction). In order to enable a better yield of detection light, however, the strip-shaped area 198 of the surface detector 188 can also have a width of several pixels in the direction of the x axis. In any case, the strip-shaped area 198 of the surface detector 188 can advantageously be used in the manner of a slit aperture in order to realize a line-by-line detection. The width, i.e. number of simultaneously activated lines, is ideally freely adjustable.

In a particularly preferred embodiment, the illumination beam used in the arrangement according to FIGS. 34 and 35 is a Bessel beam, a trimmed Bessel beam or a Mathieu beam. By means of such a beam, which can be generated by one of the radiation sources described above, the area lying next to the illumination axis z can be used to supply light to the illumination axis z, for example, according to one of the solutions shown in FIGS. 30 to 33, which is not possible by a Gaussian beam. The latter has a narrow angular spectrum, which is necessary for a high depth of focus. In contrast, for example, a Bessel beam has contributions at higher radial components in the angular spectrum. The strip-shaped area of the surface detector 188 corresponds in this case, e.g. with the line 164 indicated in FIG. 30. It thus lies in a plane conjugate to the sensor at a position along the x-axis which is imaged onto the area 198.

In FIGS. 36 and 37, a modified embodiment is shown in an xy-sectional view or a yz-sectional view, in which also an surface detector 200 with rolling shutter function is used. In contrast to the embodiments illustrated in FIGS. 34 and 35, the illumination beam 16 is produced here with a high numerical aperture and a low depth of focus. In that regard, a type of lighting can be used for this embodiment, as described above by way of example with reference to FIGS. 26 to 29.

In the arrangement shown in FIGS. 36 and 37, the illumination beam 16 is focused in such a way that it is comparatively short in the direction of the illumination axis z. In this case, the waist of the illumination beam 16 is then comparatively thin in the direction of the y axis, which represents the detection axis.

The sample region illuminated with the illumination beam 16 is imaged onto the surface detector 200 in the form of a strip elongated in the x direction. Thus, by moving the illumination beam 16 along the z-axis, the detection light strip travels on the surface detector 200 in opposite directions along the z-axis. Accordingly, the surface detector 200 is driven such that only one strip area 202 of the surface detector 200, which extends along the x axis and has a width of one or more pixels in the z axis direction, is activated at a given time and thus is effective for detection. This strip-shaped region 202 of the surface detector 200 is displaced along the z axis in order to realize the rolling shutter function synchronously with the movement of the illumination beam 16.

All of the aforementioned exemplary embodiments are used solely for the exemplary explanation of beam modulation means according to the invention. In particular, it should be pointed out that the above-described beam modulating means are not limited to those embodiments which have been specifically referred to in the explanation of these means. Thus, each means can also be combined with other embodiments. In addition, the various beam modulating means may themselves be combined as required. For example, it is possible to combine beam modulation realized by shifting the depth of focus area of the illumination beam with a beam modulation obtained by controlling the beam cross section by means of one of the beam shaping optics described above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A light sheet microscope comprising:
   an illuminator having a beam source which is configured to direct an illumination beam propagating along an illumination axis onto a sample;
   a light-sheet generator which is configured to generate a light-sheet-like illumination light distribution illuminating the sample in a partial area from the illumination beam; and
   a detection unit having a detector which is configured to capture detection light originating from the partial area of the sample illuminated with the illumination light distribution,
   wherein the illuminator comprises a beam modulator adapted to modulate the illumination beam along the illumination axis in such a way that light exposure of the partial area of the sample illuminated by the illumination light distribution is increased along the illumination axis with increasing penetration depth into the sample.

2. The light sheet microscope according to claim 1, wherein the beam modulator is configured to move a depth of focus area of the illumination beam along the illumination axis.

3. The light-sheet microscope according to claim 2, wherein the beam modulator has an illumination objective that is displaceable along the illumination axis.

4. The light sheet microscope according to claim 2, wherein the beam modulator comprises a tunable lens included in the beam source configured to move the depth of focus area of the illumination beam.

5. The light-sheet microscope according to claim 2, wherein the beam modulator has an optical element included in the beam source configured to influence the optical path length of the illumination beam.

6. The light-sheet microscope according to claim 5, wherein the beam modulator comprises several transparent blocks that are optionally introducible into a beam path of the illumination beam, the several transparent blocks having different thicknesses along the illumination axis.

7. The light sheet microscope according to claim 2, wherein the beam modulator is configured to modulate the intensity of the illumination beam depending on the position of the depth of focus area along the illumination axis.

8. The light sheet microscope according to claim 7, wherein the beam modulator is configured to increase the intensity of the illumination beam with increasing depth of penetration of the depth of focus area in the sample.

9. The light sheet microscope according to claim 2, wherein the beam modulator is configured to vary a displacement speed of the depth of focus area of the illumination beam in relation to its position along the illumination axis.

10. The light sheet microscope according to claim 9, wherein the beam modulator is configured to reduce the displacement speed of the depth of focus area of the illumination beam with increasing depth of penetration into the sample.

11. The light-sheet microscope according to claim 1, wherein the beam modulator is configured as beam shaping optics which influences a radial intensity profile in at least one direction perpendicular to the illumination axis, the beam shaping optics being used to modulate the illumination beam along the illumination axis.

12. The light sheet microscope according to claim 11, wherein the beam shaping optics are configured to adjust a transmission of the illumination beam in relation to a radial distance from the illumination axis in such a way that the intensity of the illumination beam increases along the illumination axis.

13. The light sheet microscope according to claim 11, wherein the beam shaping optics comprise first and second phase-modulating elements, of which the first phase-modulating element adjusts the phase of the illumination beam in such a way that the illumination beam has an amplitude with a predetermined profile on the second phase-modulating element.

14. The light-sheet microscope according to claim 13, wherein the first and second phase-modulating elements are formed on a one-piece component, and wherein the illumination beam reflected on the first phase-modulating element is fed back to the second phase-modulating element via a mirror.

15. The light sheet microscope according to claim 13, wherein the predetermined profile rises radially.

16. The light sheet microscope according to claim 1, further comprising an objective disposed such that the illumination beam penetrates a region of a pupil of the objective which is shifted from a center of the pupil.

17. The light sheet microscope according to claim 1, wherein the beam modulator is configured to modulate the illumination beam along the illumination axis in such a manner that effects of scattering and/or absorption are at least partly compensated for.

18. A method for microscopically imaging a sample, the method comprising:
   directing an illumination beam propagating along an illumination axis onto the sample;
   generating a light-sheet-like illumination light distribution illuminating the sample in a partial area from the illumination beam; and
   detecting detection light originating from the partial area of the sample illuminated with the illumination light distribution,
   wherein the illumination beam is modulated along the illumination axis in such a way that light exposure of the partial area of the sample illuminated by the illumination light distribution increases along the illumination axis with increasing penetration depth into the sample.

19. The method according to claim 18, wherein the illumination light distribution for non-linear fluorescence excitation of the sample is used.

20. The method according to claim 18, wherein a beam modulator moves a depth of focus area of the illumination beam along the illumination axis during image acquisition.

21. The method according to claim 20, wherein the beam modulator has an illumination objective that is displaced along the illumination axis during the image acquisition.

\* \* \* \* \*